US012755949B2

(12) United States Patent
Rusinov

(10) Patent No.: US 12,755,949 B2
(45) Date of Patent: Oct. 6, 2026

(54) ION ANALYSIS USING IMAGE-CHARGE/CURRENT ANALYSIS

(71) Applicant: SHIMADZU CORPORATION, Kyoto (JP)

(72) Inventor: Aleksandr Rusinov, Altrincham (GB)

(73) Assignee: SHIMADZU CORPORATION, Kyoto (JP)

( * ) Notice: Subject to any disclaimer, the term of this patent is extended or adjusted under 35 U.S.C. 154(b) by 261 days.

(21) Appl. No.: 18/704,299

(22) PCT Filed: Oct. 25, 2021

(86) PCT No.: PCT/EP2021/079567
§ 371 (c)(1),
(2) Date: Apr. 24, 2024

(87) PCT Pub. No.: WO2023/072366
PCT Pub. Date: May 4, 2023

(65) Prior Publication Data
US 2024/0404812 A1 Dec. 5, 2024

(51) Int. Cl.
*H01J 49/00* (2006.01)

(52) U.S. Cl.
CPC ...... *H01J 49/0036* (2013.01); *H01J 49/0004* (2013.01)

(58) Field of Classification Search
CPC .......................... H01J 49/0036; H01J 49/0004
See application file for complete search history.

(56) References Cited

U.S. PATENT DOCUMENTS 11,011,364 B2 * 5/2021 Rusinov ................ H01J 49/406
2002/0187403 A1 * 12/2002 Hinokuma .............. C01B 32/15 429/316

(Continued)

FOREIGN PATENT DOCUMENTS

EP 3293755 A1 3/2018
WO 2012/116765 A1 9/2012

(Continued)

OTHER PUBLICATIONS

Aaron R. Todd et al., "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.

(Continued)

*Primary Examiner* — Nicole M Ippolito
(74) *Attorney, Agent, or Firm* — Muir Patent Law, PLLC

(57) ABSTRACT

A method of processing data determined from an image-charge/current signal representative of ions of a given charge state (Q) undergoing oscillatory motion of a respective oscillation frequency (ω) within an ion analyser apparatus. The method comprises acquiring a data set comprising a first measured signal frequency ($\omega_1$) associated with a first part of a measured image-charge/current signal of an ion and a second measured signal frequency ($\omega_2$) associated with a subsequent second part of the measured image-charge/current signal of the ion. The method includes estimating a charge state (Q) of the ion undergoing oscillatory motion of said first measured signal frequency ($\omega_1$) and subsequently of said second measured signal frequency ($\omega_2$) and therewith estimating the value of a mass change Δm to substantially match a reference mass corresponding to a mass of one or more neutral loss. The method includes estimating the mass (M) of a deprotonated molecule forming a part of the ion (Continued)

according to the estimated charge state (Q) of the ion, the first measured signal frequency ($\omega_1$), the quantified mass change value $\Delta m$, and the mass-to-charge ratio ($m_p/e$) of a protonating proton.

15 Claims, 11 Drawing Sheets

(56) References Cited

U.S. PATENT DOCUMENTS

| | | | | |
|---|---|---|---|---|
| 2008/0067352 | A1* | 3/2008 | Wang | H01J 49/0463 250/288 |
| 2019/0164735 | A1 | 5/2019 | Yip et al. | |
| 2024/0387157 | A1* | 11/2024 | Ding | H01J 49/0036 |

FOREIGN PATENT DOCUMENTS

| | | | |
|---|---|---|---|
| WO | 2019/231854 | A1 | 12/2019 |
| WO | 2020/219605 | A1 | 10/2020 |

OTHER PUBLICATIONS

Anonymous: "Central processing unit"—Wikipedia, Oct. 20, 2021 (Oct. 20, 2021), XP55939186, Retrieved from the Internet: URL: https://en.wikipedia.org/w/index.php?title=Central_processing_unit &oldid=1050895 705 [retrieved on Jul. 6, 2022].

Bruce, J. E., et al. "Trapping, detection, and mass measurement of individual ions in a Fourier transform ion cyclotron resonance mass spectrometer." Journal of the American Chemical Society 116.17 (1994): 7839-7847.

Cheng, Xueheng, et al. "Charge-state shifting of individual multiply-charged ions of bovine albumin dimer and molecular weight determination using an individual-ion approach." Analytical chemistry 66.13 (1994): 2084-2087.

Elliott, Andrew G., et al. "Mass, mobility and MS n measurements of single ions using charge detection mass spectrometry." Analyst 142.15 (2017): 2760-2769.

Elliott, Andrew G., et al. "Simultaneous measurements of mass and collisional cross-section of single ions with charge detection mass spectrometry." Analytical chemistry 89.14 (2017): 7701-7708.

Kafader, Jared O., et al. "Multiplexed mass spectrometry of individual ions improves measurement of proteoforms and their complexes." Nature methods 17.4 (2020): 391-394.

Kafader, Jared O., et al. "STORI plots enable accurate tracking of individual ion signals." Journal of The American Society for Mass Spectrometry 30 (2019): 2200-2203.

Shockley, William. "Currents to conductors induced by a moving point charge." Journal of applied physics 9.10 (1938): 635-636.

Keifer, David Z., Deven L. Shinholt, and Martin F. Jarrold. "Charge detection mass spectrometry with almost perfect charge accuracy." Analytical chemistry 87.20 (2015): 10330-10337.

Liang, Yuxue, et al. "Collision-induced dissociation of deprotonated peptides. Relative abundance of side-chain neutral losses, residue-specific product ions, and comparison with protonated peptides." Journal of The American Society for Mass Spectrometry 29.3 (2017): 463-469.

Murray, Kermit K., et al. "Definitions of terms relating to mass spectrometry (IUPAC Recommendations 2013)." Pure and Applied Chemistry 85.7 (2013): 1515-1609. https://doi.org/10.1351/PAC-REC-06-04-06.

Neta, Pedatsur, et al. "Consecutive neutral losses of H2O and C2H40 from N-Terminal Thr-Thr and Thr-Ser in collision-induced dissociation of protonated peptides: Position dependent water loss from single Thr or Ser." International Journal of Mass Spectrometry 267.1-3 (2007): 295-301.

Ramo, Simon. "Currents induced by electron motion." Proceedings of the IRE 27.9 (1939): 584-585.

Rusinov Aleksandr et al.: "CDMS mode of FTMS Orbital Frequency Analyzer", poster at ASMS 2021, Nov. 17, 2021 (Nov. 17, 2021), XP55939088, Retrieved from the Internet: URL:https://lcms.cz/labrulez-bucket-strapi-3hsga3/WP_128_918b023b5b/WP-128.pdf [retrieved on Jul. 6, 2022] section 6. Mass Loss method (m1CDMS).

Rusinov, Aleksandr, et al. "Protein Analysis by Electrospray-Orbital Frequency Analyzer with Charge Detection Mass Spectrometry Algorithm." Journal of the American Society for Mass Spectrometry 32.5 (2021): 1145-1154. Retrieved from the Internet: URL:https://pubs.acs.org/doi/pdf/10.1021/jasms.0c00445>abstract.

* cited by examiner

ION ANALYSIS USING IMAGE-CHARGE/CURRENT ANALYSIS

FIELD OF THE INVENTION

The present invention relates to methods and apparatus for ion analysis using image-charge/current analysis and an ion analyser apparatus therefor. Particularly, although not exclusively, the invention relates to analysis of image-charge/current signals for determining the charge of an ion. For example, image-charge/current signals may be generated by an ion mobility analyser, a charge detection mass spectrometer (CDMS) or an ion trap apparatus such as: an ion cyclotron, an Orbitrap®, an electrostatic linear ion trap (ELIT), a quadrupole ion trap, an Orbital Frequency Analyser (OFA), a Planar Electrostatic Ion Trap (PEIT), or other ion analyser apparatus for generating oscillatory motion therein.

BACKGROUND

Image-charge/current signals may be acquired in mass spectrometers which use non-destructive detection of signals containing periodic components corresponding to oscillations of certain trapped ion species. However, the invention is applicable to any other field ion analysis where signals containing periodic components need to be analysed. The frequency of ion motion depends on its mass-to-charge (m/z) ratio, and where multiple packets of ions exist within an ion analyser (e.g., ion trap), the motion of each packet of ions with the same m/z ratio may be synchronous as provided by the focusing properties of an ion analyser.

Detection of ions using image charges is based on principles derived by Shockley [W. Shockley: "*Currents to Conductors Induced by a Moving Point Charge*", Journal of Applied Physics 9, 635 (1938)] and Ramo [S. Ramo: "*Currents Induced by Electron Motion*", Proceedings of the IRE, Volume 27, Issue 9, September 1939]. Here, it was shown that a measurable current is induced in an electrode by the image of a moving charge passing by that electrode. The induced image charge, q, on the electrode of a detector device produced by a charge Q moving in free space with a vector of velocity ($\vec{v}$(r)), depends upon only the location, r, and velocity of the moving charge and the configuration of the electrodes of the detector device. The image charge q is independent of the bias voltages applied to the electrodes, and of any space charge present, and is given by:

$$q = -QV(r)$$

Here V(r) is the potential of the electrostatic field at the location of the charge given by vector r within the detector apparatus under the following circumstances: the selected electrode in the absence of the charge Q is at unit potential, all other electrodes are at zero potential. The induced image-charge current, I, is given by the rate of change of this quantity as follows:

$$I = \frac{dq}{dt} = -Q\frac{dV(r)}{dt} = -Q\frac{dV(r)}{dr}\cdot\frac{dr}{dt} = Q\vec{E}(r)\cdot\vec{v}(r)$$

Here $\vec{E}$(r) is an electric field (vector) known as the "weighting field". As a simple and illustrative example of how this relationship may be implemented, consider a detector apparatus comprising a pair of plane parallel electrode plates separated by a uniform distance d, between which an ion of charge Q moves at speed $v_0$ in a circular orbit in a plane which is perpendicular to the plane of the two electrode plates. The "weighting field" is uniform and directed perpendicular to the electrode plates and parallel to the ion orbit (practically speaking, this is effectively true if the dimensions of the plates are much larger than the distance between them, so that fringing field effects are negligible). Thus:

$$\vec{E}(r)\cdot\vec{v}(r) = \frac{v_0}{d}\cos(\omega t + \varphi)$$

As a result, the induced image-charge/current is a sinusoidal oscillatory signal of the form:

$$I = Q\frac{v_0}{d}\cos(\omega t + \varphi)$$

The amplitude of the induced image-charge current is proportional to the charge, Q, of the ion. By measuring this amplitude, one may determine the charge on the ion once the constant of proportionality term $v_0/d$ is taken into account. More generally, the same principle applies to more complex electrode structures of a detector apparatus, in that the amplitude of the induced image-charge/current is proportional to the charge, Q, of the ion, and the constant of proportionality term will differ depending upon the geometry of the electrodes of the detector apparatus.

The frequency of oscillatory ion motion can be determined very precisely, but the accuracy by which ion charge Q may be estimated by direct image-charge/current signal measurement is severely deteriorated by electronic noise within the ion analyser apparatus. A well-known relationship exists between the mass-to-charge ratio (m/z) of an ion undergoing oscillatory motion in an image-charge/current type mass analyser device and its signal frequency, $\omega_i$:

$$\left(\frac{m}{z}\right)_i = \left(\frac{\alpha}{\omega_i}\right)^2$$

Here, the term α is a calibration constant that is dependent upon the geometry of the image-charge/current type mass analyser device and the energy of the ion. This means that an estimate of ion mass M may be made using an estimate of ion charge as follows:

$$M_i = \left(\frac{m}{z}\right)_i Q_i = \left(\frac{\alpha}{\omega_i}\right)^2 Q_i$$

Due to the typically high level of electronical noise in circuits designed to make these measurements the determination of ion charge $Q_i$ has poor accuracy so that mass $M_i$ spectra generated using these charge determinations is also poor. A problem exists with electronical noise improvement and so a widely perceived problem to solve is how to improve the accuracy of charge determination given these noise problems.

Noise may be suppressed by measuring a very long duration of a given image charge signal. This would require one to pump the ion trap system to an extremely high vacuum state, otherwise a flying ion may too quickly collide with a gas molecule resulting termination of the image charge signal too soon due to ion fragmentation or due to a dramatic change of ion trajectory. It will be very expensive to pump the chamber of an ion trap to the required lower pressure.

In CDMS, a measured mass accuracy is determined by the accuracies with which the quantities of mass-to-charge ratio (m/z) and ion charge (Q) are determined. The accuracy of an (m/z) value is dependent upon the ion focusing capabilities of the ion trap at hand. The accuracy of charge (Q) determination is a cornerstone of CDMS and this is severely limited by electronic noise in an instrument. Proper charge accuracy currently requires bespoke circuit design, cryogenic cooling and long image charge signal duration.

The present invention has been devised in light of the above considerations.

SUMMARY OF THE INVENTION

The inventors have realised a process to more accurately determine the mass of a molecule forming a part of an ion (e.g., when the ion charge is the result of protonation of the neutral molecule) based on a procedure of measuring (estimating) mass loss from an ion due to loss of a neutral loss species from the ion during oscillatory motion. The result of such a mass loss is to cause a change in the frequency of an induced image-charge/current signal associated with the ion after the loss of the neutral loss species from the ion as compared to the frequency of an induced image-charge/current signal associated with the ion before the loss of the neutral loss species from the ion. The inventors have found that this information permits one to generate more accurate mass determinations of a molecule forming a part of an ion despite the presence of signal noise due to electronic noise in an instrument.

The frequency of oscillatory ion motion can be determined very precisely, but the accuracy by which ion charge Q may be estimated by direct image-charge/current signal measurement is severely deteriorated by electronic noise within the ion analyser apparatus. A well-known relationship exists between the mass-to-charge ratio (m/z) of an ion undergoing oscillatory motion in an image-charge/current type mass analyser device and its signal frequency, $\omega_i$:

$$\left(\frac{m}{z}\right)_i = \left(\frac{\alpha}{\omega_i}\right)^2$$

Here, the term α is a calibration constant that is dependent upon the geometry of the image-charge/current type mass analyser device and the energy of the ion. The invention relates to analysis of image-charge/current signals using this relationship. For example, in image-charge/current analysis methods one may measure the mass-to-charge ratio (m/z) of an ion and its charge (Q) to enable one to estimate the mass of the ion via the relation:

$$M = (\text{m/z})\,Q$$

A mass value of a molecule forming a part of an ion can be measured (estimated) when an estimated mass loss value, or mass change/reduction value, achieves a value sufficiently close a known mass of a known neutral loss species. Correct assignments of a changeable estimate of the ion charge value may improve a resulting mass estimate. One may obtain a higher accuracy mass spectrum using the output of an image-charge/current system with low charge measurement accuracy. This removes the need, in prior art systems, to employ complex and expensive optimised components and cryogenic cooling of the detection circuitry of an image-charge/current system. The invention provides a way of achieving improved measured ion mass accuracy without the need to resort to complex and expensive electronics and/or cryogenics.

In a first aspect, the invention provides a method of processing data determined from an image-charge/current signal representative of ions of a given charge state (Q) undergoing oscillatory motion of a respective oscillation frequency (ω) within an ion analyser apparatus, the method comprising:

acquiring a data set comprising a first measured signal frequency ($\omega_1$) associated with a first part of a measured image-charge/current signal of an ion and a second measured signal frequency ($\omega_2$) associated with a subsequent second part of the measured image-charge/current signal of the ion;

estimating a charge state (Q) of the ion undergoing oscillatory motion of said first measured signal frequency ($\omega_1$) and subsequently of said second measured signal frequency ($\omega_2$) such that the value of a mass change quantifiable as:

$$\Delta m = Q\left[\left(\frac{\alpha}{\omega_1}\right)^2 - \left(\frac{\alpha}{\omega_2}\right)^2\right]$$

substantially matches a reference mass corresponding to a mass of one or more neutral losses where a is a pre-set calibration constant; and, estimating the mass (M) of a deprotonated molecule forming a part of the ion according to the estimated charge state (Q) of the ion, the first measured signal frequency ($\omega_1$), the quantified mass change value Δm, and the mass-to-charge ratio ($m_p$/e) of a protonating proton, according to the relation:

$$M = Q\left[\left(\frac{\alpha}{\omega_1}\right)^2 - \left(\frac{m_p}{e}\right)\right] - \Delta m.$$

The terms "neutral loss" may be considered to refer to a loss of an uncharged species (e.g., particle, molecule etc.) from an ion during dissociation. This definition is in accordance with the IUPAC recommendations 2013 definition available in: Murray, Kermit K., Boyd, Robert K., Eberlin, Marcos N., Langley, G. John, Li, Liang and Naito, Yasuhide. "*Definitions of terms relating to mass spectrometry* (*IUPAC Recommendations* 2013)" Pure and Applied Chemistry, vol. 85, no. 7, 2013, pp. 1515-1609, [https://doi.org/10.1351/PAC-REC-06-04-06]. The estimated mass (M) of the "deprotonated" molecule that forms a part of the ion may be considered to refer to the mass of the molecule as if it had no protonating protons attached to it. By notionally removing the protonating protons (i.e., "deprotonating" the molecule) one notionally removes the charge Q (in units of the proton charge $e=1.602176634\times10^{-19}$ C) of the ion as created by the presence of the protonating protons, and notionally removes the mass of the protonating protons, given by:

$$\left(\frac{m_p}{e}\right)Q$$

where the numerical value of Q/e corresponds to the number of protonating protons present upon the molecule (each having one unit of charge).

The reference mass corresponding to a mass of one or more neutral losses is preferably an integer value (in units of Da). The reference mass corresponding to a mass of one or more neutral losses may be one or more masses selected from: 1 Da (H), 2 Da (H2), 17 Da (OH or $NH_3$), or 18 Da ($H_2O$) or some other mass.

Preferably, the estimated charge state (Q) is positive integer. Preferably, the estimating of a charge state (Q) of the ion comprises initially estimating a non-integer value of the charge state and subsequently rounding the non-integer value to the nearest integer value such that the estimated charge state (Q) is positive integer. The estimating of the charge state may comprise providing a plurality of different charge estimates lying within a range of charge values (e.g., $Q_{MIN}\leq Q\leq Q_{MAX}$) constrained such that a range of the corresponding plurality of different values (e.g., $\Delta m_{MIN}\leq\Delta m\leq\Delta m_{MAX}$) of a mass change quantifiable as:

$$\Delta m = Q\left[\left(\frac{\alpha}{\omega_1}\right)^2 - \left(\frac{\alpha}{\omega_2}\right)^2\right]$$

does not exceed 2 Da (i.e., not more than ±1 Da from the middle of the range), or more preferably does not exceed 1 Da (i.e., not more than ±0.5 Da from the middle of the range). Preferably, the quantity:

$$\frac{\Delta m_{MAX} - \Delta m_{MIN}}{Q_{MAX} - Q_{MIN}} = \left[\left(\frac{\alpha}{\omega_1}\right)^2 - \left(\frac{\alpha}{\omega_2}\right)^2\right] \leq X$$

is such the quantity X is a pre-set threshold value which may be a value in the range $0<X\leq 0.5$, or preferably in the range $0<X\leq 0.25$. or desirably in the range $0<X\leq 0.1$. Preferably, $X<<1.0$.

A plurality of estimated mass loss values (Δm) corresponding to a plurality estimated values of the ion charge state (e.g., [Q]−2, [Q]−1, [Q], [Q]+1, [Q]+2) may be provided. The method may comprise selecting the mass loss estimate (Δm) that lies closest to a nominal integer-valued reference mass having an integer value in Daltons. The method may comprise determining whether the closest-lying mass loss estimate lies within a pre-set threshold proximity range from the nominal integer-valued reference mass, e.g., a proximity of not more than 0.2 Da, or more preferably not more than 0.1 Da, and selecting the mass loss estimate that is the closest-lying mass loss estimate value and also lies within the pre-set threshold proximity range. This may then provide both the estimated ion charge (Q) and corresponding estimated mass loss value (Δm).

Desirably, the estimating a charge state (Q) of the ion comprises estimating an integer value of the charge state, and subsequently varying the integer value of the estimated charge state (Q) in integer-valued steps to provide a plurality of different integer-valued estimated charge states ($Q_i$). The method may comprise subsequently comparing the reference mass of a neutral loss species to each mass change quantity (Δm) determined according to each said estimated charge states of the plurality of different integer-valued estimated charge states ($Q_i$). The method may comprise subsequently selecting the integer-valued estimated charge state which results in a value of the mass change quantity (Δm) that most closely matches a reference mass of a neutral loss t species and determining the mass (M) of the deprotonated molecule forming a part of ion according to the selected integer-valued estimated charge state.

Preferably, according to the method, the data set comprises a plurality of measured signal frequencies ($\omega_i$; i=integer>2) each associated with a respective part of the measured image-charge/current signal of an ion. According to the method, the estimating of the mass (M) of a deprotonated molecule forming a part of the ion may comprise determining a plurality of estimates ($M_j$) of said mass of a deprotonated molecule based on a respective plurality of pairs of two measured signal frequencies selected from amongst said plurality of measured signal frequencies ($\omega_i$) comprising a respective said first measured signal frequency and a respective said second measured signal frequency. The method may comprise generating an average value of the plurality of estimates ($M_j$) of respective said deprotonated molecule as the estimated mass of a deprotonated molecule.

The method may include obtaining an image-charge/current signal and therefrom determining:

- a start time $(LT_1)^{(1)}$ and an end time $(LT_2)^{(1)}$ of the image-charge/current signal corresponding to the first measured signal frequency ($\omega_1$); and,
- a start time $(LT_1)^{(2)}$ and an end time $(LT_2)^{(2)}$ of the subsequent second image-charge/current signal corresponding to the second measured signal frequency ($\omega_2$);
- wherein the value of the start time $(LT_1)^{(2)}$ of the image-charge/current signal corresponding to the second measured signal frequency exceeds the value of the end time $(LT_2)^{(1)}$ of the image-charge/current signal corresponding to the first measured signal frequency on a mutual time scale by not less than a pre-set threshold value.

In the method, the second frequency preferably exceeds the first frequency by a value not exceeding a pre-set threshold value.

In a second aspect, the invention provides a computer program or a computer program product comprising instructions which, when the program is executed by a computer, cause the computer to carry out the method described above in relation to the first aspect.

In a third aspect, the invention provides data processing apparatus comprising one or more processors configured for carrying out the method described above in relation to the first aspect.

In a fourth aspect, the invention provides an ion analyser apparatus configured for generating an image-charge/current signal representative of ions of a given charge state (Q) undergoing oscillatory motion of a respective oscillation frequency (ω) within an ion analyser apparatus, the apparatus comprising:

- an ion analysis chamber configured for receiving said one or more ions and for generating said image charge/current signal in response to said oscillatory motion;
- a signal recording unit configured for recording the image charge/current signal as a recorded signal in the time domain;

a signal processing unit for processing the recorded signal to:

acquire a data set comprising a first measured signal frequency ($\omega_1$) associated with a first part of a measured image-charge/current signal of an ion and a second measured signal frequency ($\omega_2$) associated with a subsequent second part of the measured image-charge/current signal of the ion;

estimate a charge state (Q) of the ion undergoing oscillatory motion of said first measured signal frequency ($\omega_1$) and subsequently of said second measured signal frequency ($\omega_2$) such that the value of a mass change quantifiable as:

$$\Delta m = Q\left[\left(\frac{\alpha}{\omega_1}\right)^2 - \left(\frac{\alpha}{\omega_2}\right)^2\right]$$

substantially matches a reference mass corresponding to a mass of one or more neutral losses where a is a pre-set calibration constant; and, estimate the mass (M) of a deprotonated molecule forming a part of the ion according to the estimated charge state (Q) of the ion, the first measured signal frequency ($\omega_1$), the quantified mass change value Δm, and the mass-to-charge ratio ($m_p$/e) of a protonating proton, according to the relation:

$$M = Q\left[\left(\frac{\alpha}{\omega_1}\right)^2 - \left(\frac{m_p}{e}\right)\right] - \Delta m.$$

The signal processing unit may be configured to perform said estimating a charge state (Q) of the ion by initially estimating a non-integer value of the charge state and subsequently rounding the non-integer value to the nearest integer value such that the estimated charge state (Q) is positive integer.

The signal processing unit may be configured to perform said estimating a charge state (Q) of the ion by:

estimating an integer value of the charge state;

subsequently varying the integer value of the estimated charge state (Q) in integer-valued steps to provide a plurality of different integer-valued estimated charge states ($Q_i$);

comparing the reference mass of a neutral loss species to each mass change quantity (Δm) determined according to each said estimated charge states of the plurality of different integer-valued estimated charge states ($Q_i$); and, selecting the integer-valued estimated charge state which results in a value of the mass change quantity (Δm) that most closely matches a reference mass of a neutral loss species and determining the mass (M) of a deprotonated molecule forming a part of the ion according to the selected integer-valued estimated charge state.

The data set may comprise a plurality of measured signal frequencies ($\omega_i$; i=integer>2) each associated with a respective part of the measured image-charge/current signal of an ion. The signal processing unit may be configured to estimate the mass (M) of a deprotonated molecule forming a part of the ion by:

determining a plurality of estimates ($M_j$) of said mass of a deprotonated molecule based on a respective plurality of pairs of two measured signal frequencies selected from amongst said plurality of measured signal frequencies ($\omega_i$) comprising a respective said first measured signal frequency and a respective said second measured signal frequency; and, generating an average value of the plurality of estimates ($M_j$) of respective said deprotonated molecule as the estimated mass of a deprotonated molecule.

The signal processing unit may be configured to determine from the recorded signal:

a start time $(LT_1)^{(1)}$ and an end time $(LT_2)^{(1)}$ of the image-charge/current signal corresponding to the first measured signal frequency ($\omega_1$); and, a start time $(LT_1)^{(2)}$ and an end time $(LT_2)^{(2)}$ of the subsequent second image-charge/current signal corresponding to the second measured signal frequency ($\omega_2$);

wherein the value of the start time $(LT_1)^{(2)}$ of the image-charge/current signal corresponding to the second measured signal frequency exceeds the value of the end time $(LT_2)^{(1)}$ of the image-charge/current signal corresponding to the first measured signal frequency on a mutual time scale by not less than a pre-set threshold value.

Preferably, the second frequency exceeds the first frequency by a value not exceeding a pre-set threshold value applied by the signal processing unit.

In a fifth aspect, the invention provides an ion analyser apparatus comprising any one or more of: an ion cyclotron resonance trap; an Orbitrap® configured to use a hyperlogarithmic electric field for ion trapping; an electrostatic linear ion trap (ELIT); a quadrupole ion trap; an ion mobility analyser; a charge detection mass spectrometer (CDMS); Electrostatic Ion Beam Trap (EIBT); a Planar Orbital Frequency Analyser (POFA); or a Planar Electrostatic Ion Trap (PEIT), for generating said oscillatory motion therein.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIG. 7 "view (a)" shows a schematic representation of a 2D function of an image-charge/current signal such as shown in FIG. 4*b*, in which a process of segmentation has been applied and in which co-registration has been applied. FIG. 7 "view (a)" is equivalent to the "view (a)" indicated in FIG. 4*b* whereby a view of a second dimension of time is suppressed, and a view of a first dimension of time is presented.

FIG. 7 "view (b)" shows a schematic representation of a 2D function of an image-charge/current signal such as shown in FIG. 7 "view (a)", in which a process of thresholding has been applied. FIG. 7 "view (b)" is equivalent to the "view (b)" indicated in FIG. 4*b* whereby a view of both a second dimension of time and a view of a first dimension of time are presented.

FIG. 8 "view (a)" shows a schematic representation of a 2D function of an image-charge/current signal such as shown in FIG. 4*b*, in which a process of segmentation has been applied and in which co-registration has been applied. FIG. 8 "view (a)" is equivalent to the "view (a)" indicated in FIG. 4*b* whereby a view of a second dimension of time is suppressed, and a view of a first dimension of time is presented.

FIG. 8 "view (b)" shows a schematic representation of a 2D function of an image-charge/current signal such as shown in FIG. 8 "view (a)", in which a process of thresholding has been applied. FIG. 8 "view (b)" is equivalent to the "view (b)" indicated in FIG. 4*b* whereby a view of both a second dimension of time and a view of a first dimension of time are presented.

DETAILED DESCRIPTION OF THE INVENTION

Figures 1A, 1B, 1C:
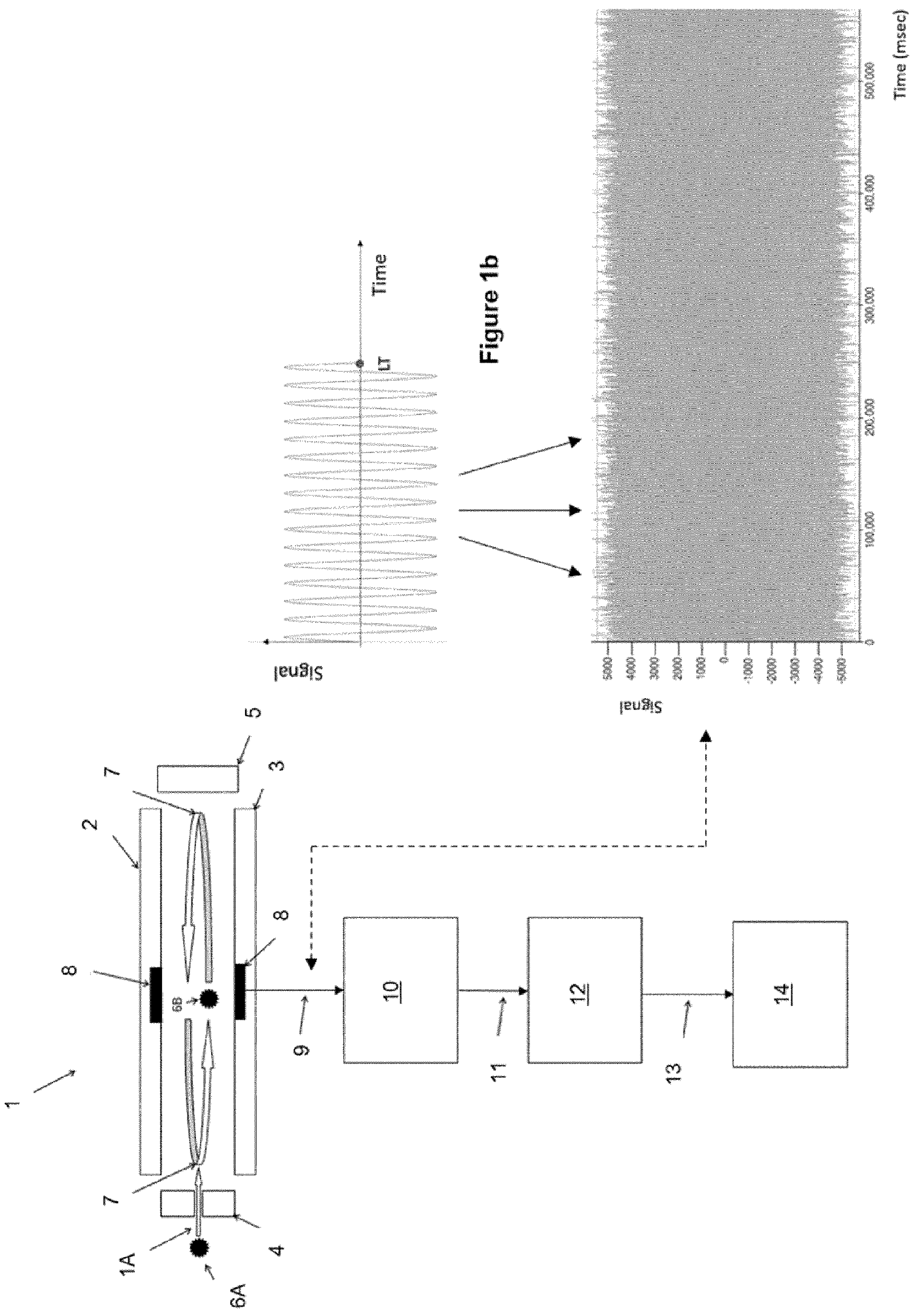
FIG. 1*a* shows a schematic representation of a CDMS ion analyser apparatus.
FIG. 1*b* shows a schematic representation of a CDMS image-charge/current signal generated by the CDMS ion analyser apparatus of FIG. 1*a*.
FIG. 1*c* shows a typical CDMS image-charge/current signal output generated by the CDMS ion analyser apparatus of FIG. 1*a* and comprising a plurality of concurrent CDMS image-charge/current signals of FIG. 1*b*.

Aspects and embodiments of the present invention will now be discussed with reference to the accompanying figures. Further aspects and embodiments will be apparent to those skilled in the art. All documents mentioned in this text are incorporated herein by reference.

In the drawings, like items are assigned like reference symbols, for consistency. In the following example, image-charge/current signals are generated by a real or simulated charge detection mass spectrometer (CDMS) and are referred to as CDMS image-charge/current signals. However, it is to be understood that the image-charge/current signals may alternatively be generated by an ion mobility analyser, or an ion trap apparatus such as: an ion cyclotron, an Orbitrap®, an electrostatic linear ion trap (ELIT), a quadrupole ion trap, an Orbital Frequency Analyser (OFA), a Planar Electrostatic Ion Trap (PEIT), or other ion analyser apparatus for generating oscillatory motion therein.

FIG. 1*a* shows a schematic representation of a CDMS ion analyser apparatus in the form of an electrostatic ion trap 1 for mass analysis. The electrostatic ion trap includes an ion analysis chamber (2, 3, 4, 5) configured for receiving one or more ions 6A and for generating an image charge/current signal in response to oscillatory motion 7 of the received ions 6B when within the ion analysis chamber. The ion analysis chamber comprises a first array of electrodes 2 and a second array of electrodes 3, spaced from the first array of electrodes by a substantially constant separation distance.

A voltage supply unit (not shown) is arranged to supply voltages, in use, to electrodes of the first and second arrays of electrodes to create an electrostatic field in the space between the electrode arrays. The electrodes of the first array and the electrodes of the second array are supplied, from the voltage supply unit, with substantially the same pattern of voltage, whereby the distribution of electrical potential in the space between the first and second electrode arrays (2, 3) is such as to reflect ions 6B in a flight direction 7 causing them to undergo periodic, oscillatory motion in that space. The electrostatic ion trap 1 may be configured, for example, as is described in WO2012/116765 (A1) (Ding et al.), the entirety of which is incorporated herein by reference. Other arrangements are possible, as will be readily appreciated by the skilled person.

The periodic, oscillatory motion of ions 6B within the space between the first and second arrays of electrodes may be arranged, by application of appropriate voltages to the first and second arrays of electrodes, to be focused substantially mid-way between the first and second electrode arrays for example, as is described in WO2012/116765 (A1) (Ding et al.). Other arrangements are possible, as will be readily appreciated by the skilled person.

One or more electrodes of each of the first and second arrays of electrodes, are configured as image-charge/current sensing electrodes 8 and, as such, are connected to a signal recording unit 10 which is configured for receiving an image-charge/current signal 9 from the sensing electrodes, and for recording the received image charge/current signal in the time domain. The signal recording unit 10 may comprise amplifier circuitry as appropriate for detection of an image-charge/current having periodic/frequency components related to the mass-to-charge ratio of the ions 6B undergoing said periodic oscillatory motion 7 in the space between the first and second arrays of electrodes (2, 3).

The first and second arrays of electrodes may comprise, for example, planar arrays formed by:

(a) parallel strip electrodes; and/or, (b) concentric, circular, or part-circular electrically conductive rings, as is described in WO2012/116765 (A1) (Ding et al.). Other arrangements are possible, as will be readily appreciated by the skilled person. Each array of the first and second arrays of electrodes extends in a direction of the periodic oscillatory motion 7 of the ion(s) 6B. The ion analysis chamber comprises a main part defined by the first and second arrays of electrodes and the space between them, and two end electrodes (4, 5). A voltage difference applied between the main segment and the respective end segments creates a potential barrier for reflecting ions 6B in the oscillatory motion direction 7, thereby to trap the ions within the space between the first and second arrays of electrodes. The electrostatic ion trap may include an ion source (not shown, e.g., an ion trap) configured for temporarily storing ions 6A externally from the ion analysis chamber, and then injecting stored ions 1A into the space between the first and second arrays of electrodes, via an ion injection aperture formed in one 4 of the two end electrodes (4, 5). For example, the ion source may include a pulser (not shown) for injecting ions into the space between the first and second arrays of electrodes, as is described in WO2012/116765 (A1) (Ding et al.). Other arrangements are possible, as will be readily appreciated by the skilled person.

The ion analyser 1 further incudes a signal processing unit 12 configured for receiving a recorded image-charge/current signal 11 from the signal recording unit 10, and for processing the recorded signal to determine an amplitude, or magnitude, of the time-domain signal and therewith calculate the charge of an ion undergoing oscillatory motion within the ion analyser apparatus. The signal processing unit 12 also determines a frequency of the oscillatory motion of the ion within the ion analyser apparatus.

The time-domain amplitude value representative of the charge of the target ion may be, for example, an amplitude value derived using a pre-calibrated proportionality relationship between the amplitude value and the corresponding ion charge, Q, in terms of the "weighting field" as described above. These signal processing steps are implemented by the signal processing unit 12 and will be described in more detail below. The signal processing unit 12 comprises a processor or computer programmed to execute computer program instructions to perform the above signal processing steps upon image charge/current signals representative of trapped ions undergoing oscillatory motion. The result is a value representative of the charge of the ion and/or a mass value representative of the mass of the ion. The ion analyser 1 further incudes a memory unit and/or display unit 14 configured to receive data 13 corresponding to the mass of the ion (and optionally the estimated charge on the ion), and to display the determined mass value and/or charge value to a user and/or store that value in a memory unit.

As shown in FIG. 1*c*, the image-charge/current signal 9 comprises a multitude of concurrent oscillatory signals in the time domain. Each one of the concurrent oscillatory signals within this image-charge/current signal 9 comprises a single oscillatory signal, such as schematically shown in FIG. 1*b*, which exists for a finite 'lifetime' (LT) with a substantially constant signal amplitude and a substantially constant signal frequency (ω). Because the apparatus 1, when in use, typically contains many ions of different masses and charge states, all undergoing their own oscillatory motion simultaneously, the image-charge/current signal 9 comprises a multitude of respective concurrent oscillatory signals, each of the form shown in FIG. 1*b*, but each having a different respective signal amplitude and signal frequency.

The signal processing unit 12 is configured to process the image-charge/current signal (FIG. 1*c*) to generate estimated values of the charge states (Q) of ions undergoing oscillatory motion of a respective oscillation frequency (ω) within the ion analyser apparatus. For example, the induced image-charge/current may be a sinusoidal oscillatory signal of the form:

$$I = QA\cos(\omega t + \varphi)$$

The amplitude, QA where A is a calibration constant, of the induced image-charge current is proportional to the charge, Q, of the ion and thus the charge, Q, of an ion may be estimated using the amplitude, QA, and the angular frequency, ω, of the component (FIG. 1*b*) of the overall signal (FIG. 1*c*) associated with the ion in question. The amplitude, QA, and the frequency, ω, of the component (FIG. 1*b*) of the overall signal may be obtained using methods readily known and available to the skilled person in the art. As an example, by application of a Fourier transform to the overall spectrum one may obtain the amplitude, QA, and the frequency, ω=2πf, from the relevant spectral component of the Fourier spectrum of the overall signal.

The mass-to-charge ratio (m/z) of an ion undergoing oscillatory motion in an image-charge/current type mass analyser device produces a signal angular frequency, $\omega_i$, related to the mass-to-charge ratio (m/z) as follows:

$$\left(\frac{m}{z}\right)_i = \left(\frac{\alpha}{\omega_i}\right)^2$$

Here, the term α is a calibration constant that is dependent upon the geometry of the image-charge/current type mass analyser device and the energy of the ion. The present invention employs this relationship.

The signal processing unit 12 is configured to determine from a recorded image-charge/current signal 11, a data set (FIG. 2*c*) comprising measured signal frequencies ω of a plurality of a measured CDMS image-charge/current signals (FIG. 1*b*), and a plurality of estimated ion charge values Q corresponding to respective amplitudes of each one of the plurality of measured CDMS image-charge/current signals. This determination may be achieved by applying known CDMS image-charge/current signal processing techniques, readily available to the skilled person, to the overall spectrum to obtain the amplitude, QA, and the frequency, ω, from the relevant frequency component of the overall signal.

Figures 2A, 2B, 2C:
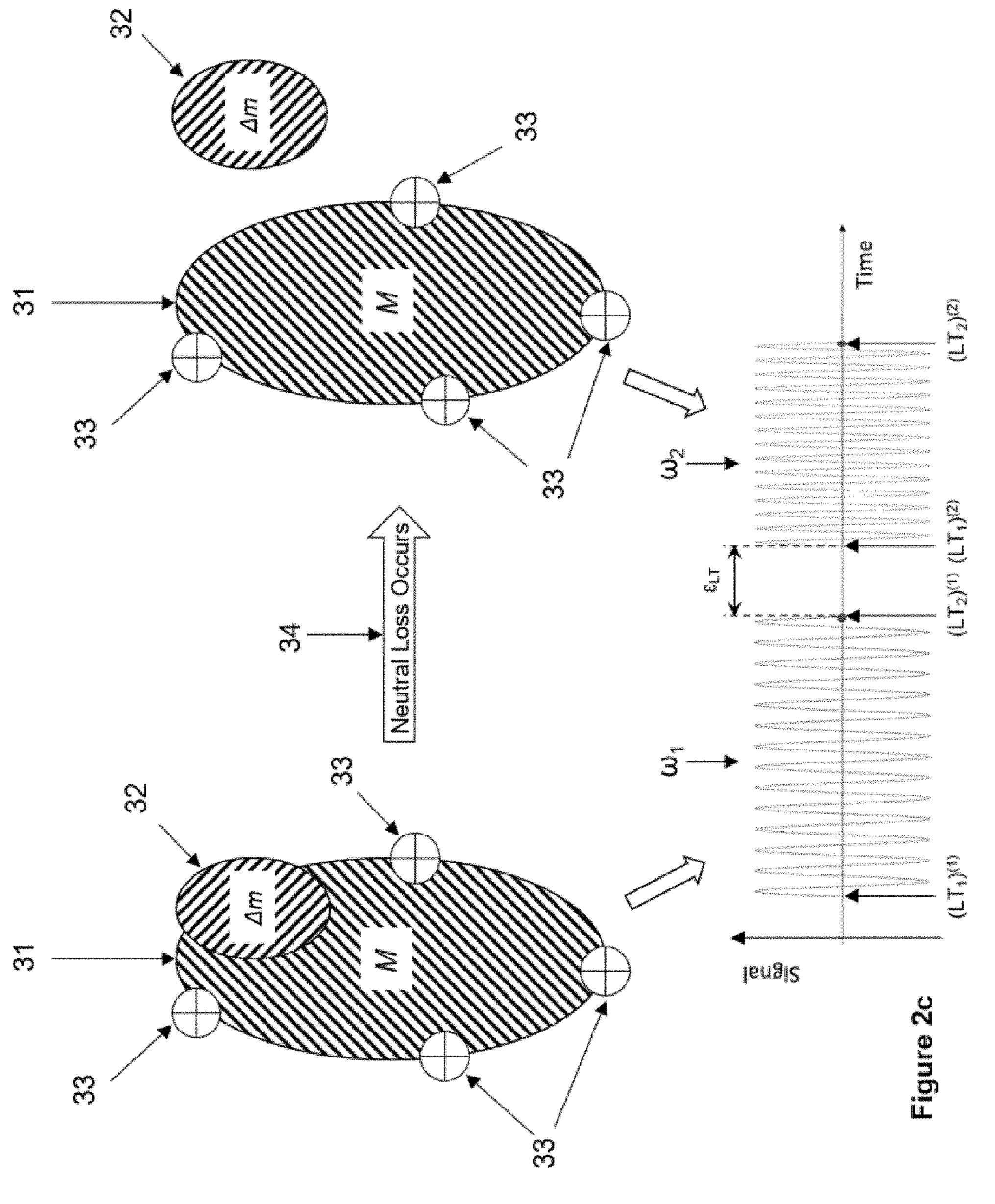
FIG. 2*a* shows a schematic representation of an ion bearing a neutral particle species and four protonating protons.
FIG. 2*b* shows a schematic representation of an ion of FIG. 2*a* bearing four protonating protons, but after collisional dissociation of the neutral particle species.
FIG. 2*c* shows a schematic representation of a CDMS image-charge/current signal generated by the CDMS ion analyser apparatus of FIG. 1*a* as induced by an ion as shown in FIG. 2*a* and subsequently as induced by an ion as shown in FIG. 2*b*.

In particular, referring to FIGS. 2*a*, 2*b* and 2*c*, the signal processing unit 12 is configured to process the recorded signal 11 to acquire from it a data set comprising a first measured signal frequency ($\omega_1$) and a second measured signal frequency ($\omega_2$). The first measured signal frequency ($\omega_1$) is associated with a first measured image-charge/current signal of an ion (21, FIG. 2*a*) when the ion has a neutral particle 32 of mass Δm attached to it, together with a number of protonating protons 33 giving the ion a positive charge state of Q. The second measured signal frequency ($\omega_2$) is associated with a subsequent second measured image-charge/current signal of the ion (21, FIG. 2*b*) when the ion no longer has an neutral particle 32 of mass Δm attached to it, because the neutral loss process 34 has taken place in which a neutral particle 32 (herein called the 'neutral loss particle') has dissociated from the ion as shown in FIG. 2*b*, but the ion continues to have the same number of protonating protons 33 as it had before the neutral loss particle dissociated (i.e., as in FIG. 2*a*) such that the ion continues to have a positive charge state of Q. Notably, the second frequency $\omega_2$ exceeds the first frequency $\omega_1$ due to the differing masses involved. This is because the mass of the particle oscillatory motion responsible for inducing the first image-charge/current signal of the first frequency $\omega_1$, has a mass comprising the mass of the ion 21, the mass of the neutral loss particle 32 attached to the ion (31, 33) and the mass of the protonating protons 33 attached to the ion and providing the ion with its positive charge state Q. By contrast, the mass of the particle oscillatory motion responsible for inducing the second image-charge/current signal of the second frequency $\omega_2$, has a mass comprising the mass of the ion (31, 33) and the mass of the protonating protons 33 attached to the ion and providing the ion with its positive charge state Q. It no longer carries the mass of the neutral loss particle 32 which has already detached from the ion (31, 33) when the second image-charge/current signal was induced.

In more detail, when the neutral loss particle 32 dissociates from the ion (31, 33), the reduction in the mass of the ion allows it to move more quickly through the trapping field of the apparatus and this reveals itself as a sudden disappearance of an initial image-charge/current signal and the subsequent appearance of a new image-charge/current signal of higher frequency. As shown in FIG. 2*c*, the original image-charge/current signal ('parent' ion superscript "(1)") may have a signal start time $(LT_1)^{(1)}$ and an end time $(LT_2)^{(1)}$ of the image-charge/current signal corresponding to the first measured signal frequency $(\omega)_1$). After a period of time $\varepsilon_{LT}$ following the end time $(LT_2)^{(1)}$ of the first ('parent') image-charge/current signal following dissociation of the neutral loss particle 32 during which the remaining 'daughter' ion (31, 33) re-establishes stable oscillatory motion within the ion analyser apparatus, a new second image-charge/current signal appears at time $(LT_1)^{(2)}$ ('daughter' ion superscript "(2)") corresponding to the beginning of the second measured signal frequency ($\omega_2$). This second image-charge/current signal has an end time $(LT_2)^{(2)}$ after which time oscillatory motion of the 'daughter' ion is lost.

The signal processing unit 12 is configured to determine from the recorded signal 11 a start time $(LT_1)^{(1)}$ and an end time $(LT_2)^{(1)}$ of the image-charge/current signal corresponding to the first measured signal frequency ($\omega_1$). This pairing of start time and end time enables the 'parent' ion signal to be identified. The signal processing unit 12 is also configured to determine from the recorded signal 11 a start time $(LT_1)^{(2)}$ and an end time $(LT_2)^{(2)}$ of the subsequent second image-charge/current signal corresponding to the second measured signal frequency ($\omega_2$). Similarly, this pairing of start time and end time enables the 'daughter' ion signal to be identified. In selecting a candidate subsequent 'daughter' ion signal to associate with a prior 'parent' signal, the signal processor is configured to consider only those values of the start time $(LT_1)^{(2)}$ of image-charge/current signals corresponding to a second measured signal frequency which satisfy the requirement of exceeding the value of the end time $(LT_2)^{(1)}$ of the designated 'parent' image-charge/current signal (on a mutual time scale) by not less than a pre-set threshold value $[\varepsilon_{LT}]_{Th}$. This deliberately excludes from consideration those candidate subsequent 'daughter' ion signals which either start before the designated 'parent' has actually ended. Ideally, a daughter ion image-charge/current signal should appear substantially at the moment of disappearance of a parent ion's image-charge/current signal. Thus, an unrealistic candidate should be an ion born long after the parent ion's time of disappearance. For example, the pre-set threshold value $\varepsilon_{LT}$ may be 50 ms. An additional condition imposed by the signal processing unit 12, is that the frequency difference, $\Delta\omega=\omega_2-\omega_1$, in the frequency between the second frequency $\omega_2$ exceeds the first frequency $\omega_1$, must be less than a pre-set threshold value $\Delta\omega_{Th}$. This deliberately excludes from consideration those candidate subsequent 'daughter' ion signals associated with image-charge/current signals having a frequency which is considered to correspond to a mass of the 'daughter' ion which is too small relative to the designated 'parent' ion. In other words, the mass difference would require the dissociation of a neutral loss particle 32 having a mass Δm which is unrealistically large.

In this way, the processor unit 12 is configured to select a 'parent' image-charge/current signal and a corresponding candidate 'daughter' image-charge/current signal (see FIG. 2*c*) in compliance with the pre-set threshold value, $\Delta\omega_{Th}$, and the pre-set threshold value $[\varepsilon_{LT}]_{Th}$ of the period of time, $\varepsilon_{LT}$, such that the selected 'parent'/'daughter' image-charge/current signals collectively represent a 'cascade' event schematically illustrated in FIGS. 2*a* and 2*b*.

The processor unit 12 is configured to estimate a charge state (Q) of the ion (31, 33) (provided by the protonating protons 33) of the 'parent' ion (31, 32, 33 collectively) undergoing oscillatory motion of the first measured signal frequency ($\omega_1$) and subsequently of the 'daughter' ion (31, 33 collectively, but not 32) of the second measured signal frequency ($\omega_2$) such that the value of a mass change quantifiable as:

$$\Delta m = Q\left[\left(\frac{\alpha}{\omega_1}\right)^2 - \left(\frac{\alpha}{\omega_2}\right)^2\right]$$

substantially matches a reference mass corresponding to a mass of one or more neutral loss particle species where α is a pre-set calibration constant. In other words, successive candidate non-integer values of Q are applied to the above expression until a value of Δm arises which corresponds to a known species of neutral loss particle. The signal processing unit then refines the estimated charge state value (Q) by subsequently rounding the non-integer value the estimated charge state value (Q) to the nearest integer value such that the estimated charge state (Q) is positive integer (i.e., real-valued Q→integer-valued [Q], brackets denoting an integer value).

The signal processing unit may preferably perform further estimation of the charge state (Q) of the ion using the estimated an integer value ([Q]) of the charge state by subsequently varying the integer value of the estimated charge state ([Q]) in integer-valued steps (e.g., [Q]−2, [Q]−1, [Q], [Q]+1, [Q]+2) to provide a plurality of different integer-valued estimated charge states ($[Q_i]$) and by comparing the reference mass of an adduct neutral loss particle species to each mass change quantity (Δm) determined according to each one of these estimated charge states ($[Q_i]$) of the plurality of different integer-valued estimated charge states. The signal processor is arranged to select the integer-valued estimated charge state ($[Q_i]$) which results in a value of the mass change quantity (Δm) that most closely matches a reference mass of a neutral loss particle species. The signal processor 12 then determines the mass (M) of the deprotonated molecule 31 that forms a part of the ion according to the selected integer-valued estimated charge state.

The signal processing unit 12 estimates the mass (M) of the deprotonated molecule 31 that forms a part of the ion (i.e., the mass of the molecule 31 as if it had none of the protonating protons attached to it) according to the estimated charge state ([Q]) of the ion, the first measured signal frequency ($\omega_1$), the quantified mass change value Δm (corresponding to a mass of a known neutral loss particle species 32), and the mass-to-charge ratio ($m_p$/e) of a proton 33, according to the relation:

$$M = Q\left[\left(\frac{\alpha}{\omega_1}\right)^2 - \left(\frac{m_p}{e}\right)\right] - \Delta m.$$

Here, since it is assumed that the charge of the ion is attributed solely to protonating protons, the mass of those protons is simply given by the mass of one proton ($m_p$) multiplied by the charge of the ion in units of proton charge (Q/e). The signal processing unit then outputs the result to the memory unit and/or display unit 14 configured to receive data 13 corresponding to the mass on the ion.

Although the above discussion relates to an estimation of the mass M of a deprotonated molecule 31 31 using two image-charge/current signal frequency values associates with one 'cascade' event between a 'parent' ion and a 'daughter' ion, it is to be understood that the signal processing unit 12 is preferably configured to generate from the recorded signal 9 a data set comprising a plurality of measured signal frequencies ($\omega_i$; i=integer>2) each associated with a respective measured image-charge/current signal of an ion. The signal processing unit may be configured to estimate the mass (M) of the deprotonated molecule 31 a plurality of times by determining a plurality of 'cascade' events between a plurality of different 'parent' ion and a 'daughter' ion pairings identifiable within the recorded signal, and to generate a corresponding plurality of estimates ($M_j$) of the mass of the deprotonated molecules 31 that forms a part of the ion 31 based on a respective plurality of these pairs of two measured signal frequencies selected from amongst the plurality of measured signal frequencies ($\omega_i$) in the manner described above. Each such pairing of 'parent' ion and a 'daughter' ion image-charge/current signals in a given cascade comprises a respective first measured signal frequency and a respective second measured signal frequency (higher in value than the first frequency) as described above.

The signal processing unit may be configured to generate an average value (i.e., the average value amongst all of the values) of the plurality of estimates ($M_j$) of the mass of the deprotonated molecule 31 that forms a part of the ion to be a best estimate of the mass ($M_{AVE}$) of the deprotonated molecule 31. This may provide a more statistically reliable estimate of the mass of the deprotonated molecule 31 by taking account of fluctuations in measurement accuracy of signal frequency values amongst the plurality of measured signal frequencies ($\omega_i$).

Multiple data analysis has revealed that we observe frequency changes for multiply charged proteins within such an analyser apparatus, presumably caused by collisions with background gas molecules. Assuming that these changes are due to neutral mass losses we analysed many such events for different proteins (Myoglobin and Aldolase). When frequency changes $\Delta\omega=\omega_2-\omega_1$ were converted into respective mass losses:

$$\Delta m = Q\left[\left(\frac{\alpha}{\omega_1}\right)^2 - \left(\frac{\alpha}{\omega_2}\right)^2\right]$$

it was found that the obtained values correspond to certain masses (NB. they did not form a continuous distribution of mass loss values). Loss of a neutral particle may be due to dissociation of a mass of 1 Da (H), 2 Da (H2), 17 Da (OH or $NH_3$), or 18 Da (H2O) or some other mass. Sometimes such losses occur several times with the same ion (up to 4 times during 2 sec), that is to say it involves several cascades of 'parent' 'daughter' events. According to the invention, the inventors have found that it is possible to adjust the estimated charge Q of the ion and postulating that it must lose a certain mass Δm. In this way, it has been found possible to determine the ion charge Q and mass M accurately even when noise levels in the apparatus are high. Different mass losses Δm are observed for different experimental conditions (e.g., Myoglobin loses mainly H, Aldolase loses mainly $H_2O$).

By gathering many such events as described above one may determine an ion charge state in this manner for each ion and built a mass spectrum using relation:

$$M = (m/z)Q$$

Figure 3A:
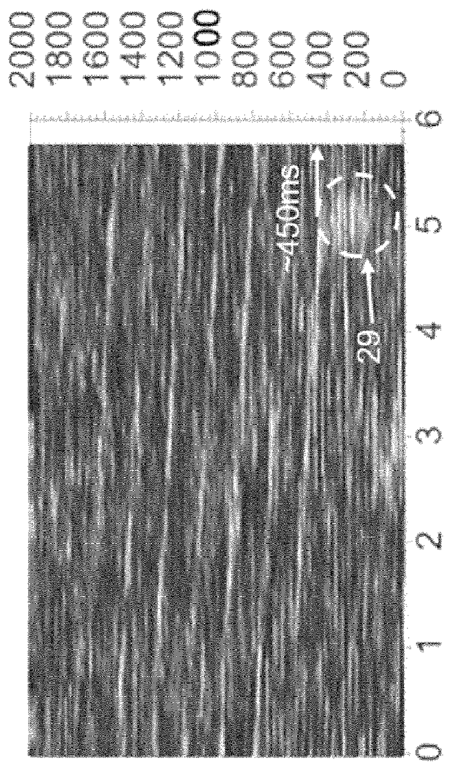
FIGS. 3*a* and 3*b* show two folded signal pictures where ion oscillation frequency change corresponds to the event of collision followed by H loss at around 450 ms.
Figure 3B:
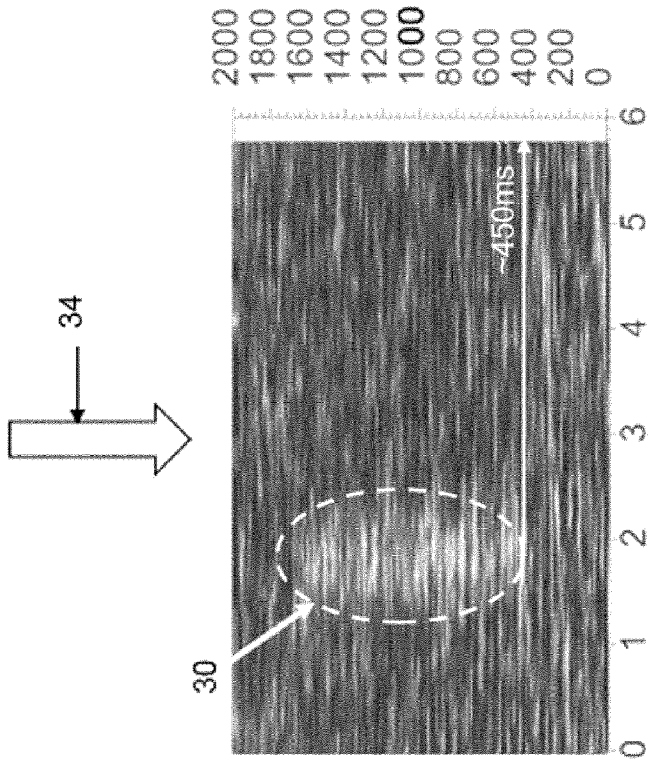

FIGS. 3*a* and 3*b* show experimental data obtained in a Charge-Detection Mass Spectrometer (CDMS) experiment with Myoglobin ions produced by electrospray ionisation (ESI). A quadrupole filter was configured to pass only 22H+ charged Myoglobin ions (i.e., protonated with twenty-two protons; and with m/z=771.25 Th) inside a cooling region.

Real-valued estimates of the ion charge may be determined for each frequency component in the image-charge/current signals. The frequency of each image-charge/current signal component may be determined using a technique explained below with reference to FIGS. 3*a* to 8. Alternatively, one may simply calculate the Fourier Transform (FT) of the image-charge/current signal, and identify a given FT peak occurring at a given frequency within the FT frequency spectrum of the signal, and then divide the amplitude by a pre-calculated calibration constant to obtain an estimate of the ion charge responsible for that signal component. For example, the induced image-charge/current may be a sinusoidal oscillatory signal of the form:

$$I = QA\cos(\omega t + \varphi)$$

The amplitude, QA where A is a calibration constant, of the induced image-charge current is proportional to the charge, Q, of the ion and thus the charge, Q, of an ion may be estimated using the amplitude, QA, and the angular frequency, ω, of the component (FIG. 1*b*) of the overall signal (FIG. 1*c*) associated with the ion in question. The amplitude, QA, and the frequency, w, of the component (FIG. 1*b*) of the overall signal may be obtained using methods readily known and available to the skilled person in the art. As an example, by application of a Fourier transform to the overall spectrum one may obtain the amplitude, QA, and the frequency, ω=2πf, from the relevant spectral component of the Fourier spectrum of the overall signal.

An estimate of the ion charge may be calculated using an average value of N estimated charge values for the ion:

$$\langle Q\rangle = \frac{\sum_{i=1}^{N} Q_i}{N}$$

We assume here that charge state is not changed at each of the contributing ion charge contributions to this average. This may occur, for example, in estimated charge values determined from signals corresponding to a sequence of successive 'cascade' stages (i.e., 'parent' to 'daughter') of the ion.

A method of determining the frequency of each image-charge/current signal component may be determined using a technique explained here with reference to FIGS. 3*a* to 8. The signal processing unit 12 may be configured for receiving a recorded image-charge/current signal 11 from the signal recording unit 10, and for processing the recorded signal (e.g., FIG. 1*c*) to:

(a) determine a value for the period of a periodic signal component (e.g., FIG. 1*b*) within the recorded signal;

(b) segment the recorded signal into a number of separate successive time segments of duration corresponding to the determined period;

(c) co-register the separate time segments in a first time dimension defining the determined period; and, (d) separate the co-registered time segments along a second time dimension transverse to the first time dimension thereby to generate a stack of time segments collectively defining a 2-dimensional (2D) function which varies both across the stack in said first time dimension according to time within the determined period and along the stack in said second time dimension according to time between successive said time segments.

These signal processing steps are implemented by the signal processing unit 12, and will be described in more detail below. The signal processing unit 12 comprises a processor or computer programmed to execute computer program instructions to perform the above signal processing steps upon image charge/current signals representative of trapped ions undergoing oscillatory motion. The result is the 2D function. The display unit 14 may be configured to receive data 13 corresponding to the 2D function, and to display the 2D function to a user.

Figure 4A:
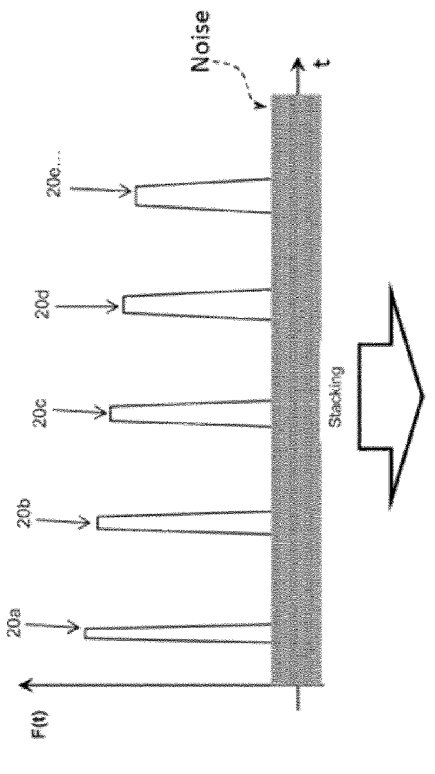
FIG. 4*a* shows a schematic representation of an image-charge/current signal representative of oscillatory motion of one or more ions in an ion analyser apparatus.

FIG. 4*a* shows a schematic representation of a one-dimensional time-domain image-charge/current signal, $F_1(t)$, generated by an ion analyser 1 of FIG. 1. The signal corresponds to the recorded image-charge/current signal 9 received by the signal processor 12 from the signal recording unit 11, and is representative of the oscillatory motion of one or more ions in the ion analyser apparatus. The signal consists of a sequence of regularly-spaced sequence of image-charge/current signal pulses (20*a*, 20*b*, 20*c*, 20*d*, 20*e* . . . ) corresponding to peaks in an image-charge/current signal each being separated, one from another, by intermediate intervals of mere noise in which no discernible signal peak is present. The idealised sinusoidal image-charge/current signal shown in FIG. 1*b* omits the effects of background signal noise which is represented more realistically in FIG. 4*a* as having the effect of obscuring low-valued parts of the idealised sinusoidal signal such that the noisy signal resembles a sequence of signal peaks rising above a noise background. These signal peaks correspond to the high-valued parts of the of the idealised sinusoidal signal that are not lost in noise.

Each signal peak corresponds to the brief duration of time when an ion 6B, or a group of ions, momentarily passes between the two opposing image-charge/current sensing electrodes 8 of the electrostatic ion trap 1 during the oscillatory motion of the ion(s) within the ion trap.

The period of oscillations by definition is the time distance between two reflections (e.g. states where ion kinetic energy is minimal and its potential energy is maximal. In symmetric systems, one can consider that an ion's oscillation period is the signal period.

A first signal peak 20*a* is generated when the ion(s) 6B passes the sensing electrodes 8, moving from left-to-right, during the first half of one cycle of oscillatory motion within the electrostatic trap, and a second signal peak 20*b* is generated when the ion(s) passes the sensing electrodes 8 again, this time moving from right to left during the second half of the oscillatory cycle. A subsequent, second cycle of oscillatory motion generates subsequent signal peaks 20*c* and 20*d*. The first half of the third cycle of oscillatory motion generates subsequent signal peaks 20*e*, and additional transient pulses (not shown) follow as the oscillatory motion continues, one cycle after another.

Successive signal peaks are each separated, each one from its nearest neighbours, in the time-domain (i.e. along the time axis (t) of the function $F_1(t)$), by a common period of time, T, corresponding to a period of what is, in effect, one periodic signal that endures for as long as the ion oscillatory motion endures within the electrostatic ion trap. In this way, the periodicity of the periodic signal is related to the period of the periodic, cyclic motion of the ion(s) within the electrostatic ion trap 1, described above. Thus, the existence of this common period of time (T) identifies the sequence of signal peaks (20*a*, 20*b*, 20*c*, 20*d*, 20*e*, . . . ) as being a "periodic component" of the image-charge/current signal, $F_1(t)$. Given that the common period of time, T, necessarily corresponds to a frequency (i.e. the inverse of the common time period), then this "periodic component" can also be described as a "frequency component". The signal, $F_1(t)$, may be harmonic or may be non-harmonic, depending on the nature of the periodic oscillatory motion of the ion(s).

Figure 4B:
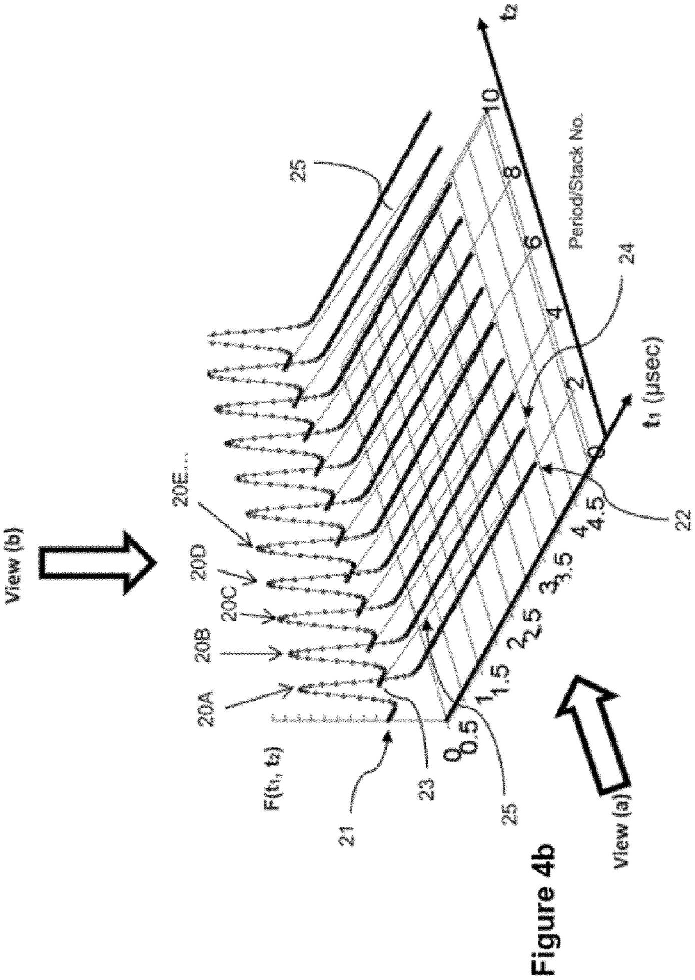
FIG. 4*b* shows a schematic representation of a 2D function comprising a stack of segmented portions of an image-charge/current signal representative of oscillatory motion of one or more ions in an ion analyser apparatus.

FIG. 4*b* shows a schematic representation of a 2D function, $F_2(t_1,t_2)$, comprising a stack of segmented portions of the image-charge/current signal, $F_1(t)$, schematically shown in FIG. 4*a*. This is an example of the 2D function defined by the data 13 generated by the signal processor 12 and output to the display unit 14. The signal processor 12 is configured to determine a value (T) for the period of the periodic component (20*a*, 20*b*, 20*c*, 20*d*, 20*e* . . . etc.) within the image-charge/current signal, $F_1(t)$, and then to segment the image-charge/current signal, $F_1(t)$, into a number of separate successive time segments of duration corresponding to the determined period. The signal processor is configured to subsequently co-register the separate time segments in a first time dimension, $t_1$, defining the determined period (T). Next, the signal processor 12 separates the co-registered time segments along a second time dimension, $t_2$, transverse (e.g. orthogonal) to the first time dimension. The result is to generate a stack of separate, successive time segments arrayed along the second time dimension. Collectively, this array of co-registered time segments defines the 2D function, $F_2(t_1,t_2)$, which varies both across the width of the stack in the first time dimension, $t_1$, according to time within the determined period, T, and also along the length of the stack in the second time dimension, $t_2$, according to time between successive time segments.

Referring to FIG. 4*b*, the period, T, of the periodic component has been determined to be T=4.5 µsec, and the continuous 1D image-charge/current signal has been segmented into a plurality of time segments (20A, 20B, 20C, 20D, 20E . . . etc.) each being 4.5 µsec in duration. Each one of the time segments of the plurality of time segments has been co-registered with each one of the other time segments of the plurality of time segments. This means that the first time segment 20A is selected to serve as a "reference" time segment against which all other time segments are co-registered. To achieve this co-registration, the time coordinate (i.e. the first time dimension $t_1$) of each signal data value/point in a given time segment, other than the "reference" time segment, is subject to the following transformation of 1D time (t) into 2D time ($t_1$, $t_2$), in order to implement a step of segmenting the recorded signal into a number of separate time segments. The result is to convert the 1D function, $F_1(t)$, into the 2D function, $F_2(t_1, t_2)$, according to the relation:

$$t \rightarrow t_1 + t_2$$

$$F_1(t) \rightarrow F_2(t_1, t_2) \sim F_1(t_1 + t_2).$$

Here the variable $t_1$ is a continuous variable with values restricted to be within the time segment, [0;T], ranging from 0 to T, where T is the period of the periodic component. The variable $t_2$ is a discreet variable with values constrained such that $t_2$=mT, where m is an integer (m=1, 2, 3 . . . , M). The upper value of m may be defined as: $M=T_{acq}/T$, where $T_{acq}$ is the 'acquisition time', which is the total time duration over which all of the data points are acquired.

The result is equivalent to a common time displacement or translation (schematically represented by item 25 of FIG. 4*b*) in a negative time direction along the first time dimension sufficient to ensure that the translated time segment starts (21, 23, . . . etc.) at time $t_1$=0 and ends (22, 24, . . . etc.) at time $t_1$=T=4.5 μsec. The result is that each time segment (20A, 20B, 20C, 20D, 20E . . . etc.) receives its own appropriate time translation (see item 25 of FIG. 4*b*) sufficient to ensure that all time segments extend only within the time interval [0;T] along the first time dimension.

It is important to note that this registration process applies to time segments as a whole and does not apply to the location of signal peaks (20*a*, 20*b*, 20*c*, 20*d*, 20*e*, . . . etc.) appearing within successive time segments. However, if the time period, T, for the periodic signal component has been accurately determined, then the result of co-registering the time segments will be the consequential co-registration of the signal peaks, and the position of successive signal peaks along the first time dimension, will be static from one co-registered time segment to the next. This is the case in the schematic drawing of FIG. 4*b*, in which we see that the signal peaks align along a linear path parallel to the axis of the second time dimension.

Conversely, if the time period, T, for the periodic signal component has not been accurately determined, then the result of co-registering the time segments will not result in a co-registration of the signal peaks, and the position of successive signal peaks along the first time dimension, will change/drift from one co-registered time segment to the next.

The signal processor 12 subsequently displaces, or translates, each one of the co-registered time segments along a second time dimension, $t_2$, which is transverse (e.g. orthogonal) to the first time dimension. In particular, each signal data value/point in a given time segment, other than the "reference" time segment, is assigned an additional coordinate data value such that each signal data point comprises three numbers: a value for the signal; a time value in the first time dimension and a value in the second time dimension. The first and second time dimension values, for a given signal data point, define a coordinate in a 2D time plane, and the signal value associated with that data point defines a value of the signal at that coordinate. In the example shown in FIG. 4*b*, the signal value is represented as a "height" of the data point above that 2D time plane.

The time displacement or translation applied along the second time dimension is sufficient to ensure that each translated time segment is spaced from its two immediately neighbouring co-registered time segments, i.e., those immediately preceding and succeeding it, by the same displacement/spacing. The result is to generate a stack of separate, successive time segments arrayed along the second time dimension, which collectively defines the 2D function, $F_2(t_1, t_2)$, as shown in FIG. 4*b*. This function varies both across the width of the stack in the first time dimension, $t_1$, so as to indicate the position and shape of the signal peak within the time [0;T], and also along the length of the stack in the second time dimension, $t_2$, according to time between successive time periods, or stack-segment number. Since the time interval between the beginning of the $n^{th}$ and $(n+1)^{th}$ stack, or between any two points with the same coordinate in the first time dimension, is necessarily equal to the time period, T, then the successive time segments are inherently spaced along the second time dimension by a time interval of T seconds (e.g. 4.5 μsec in the example of FIG. 4*b*).

Figure 5:
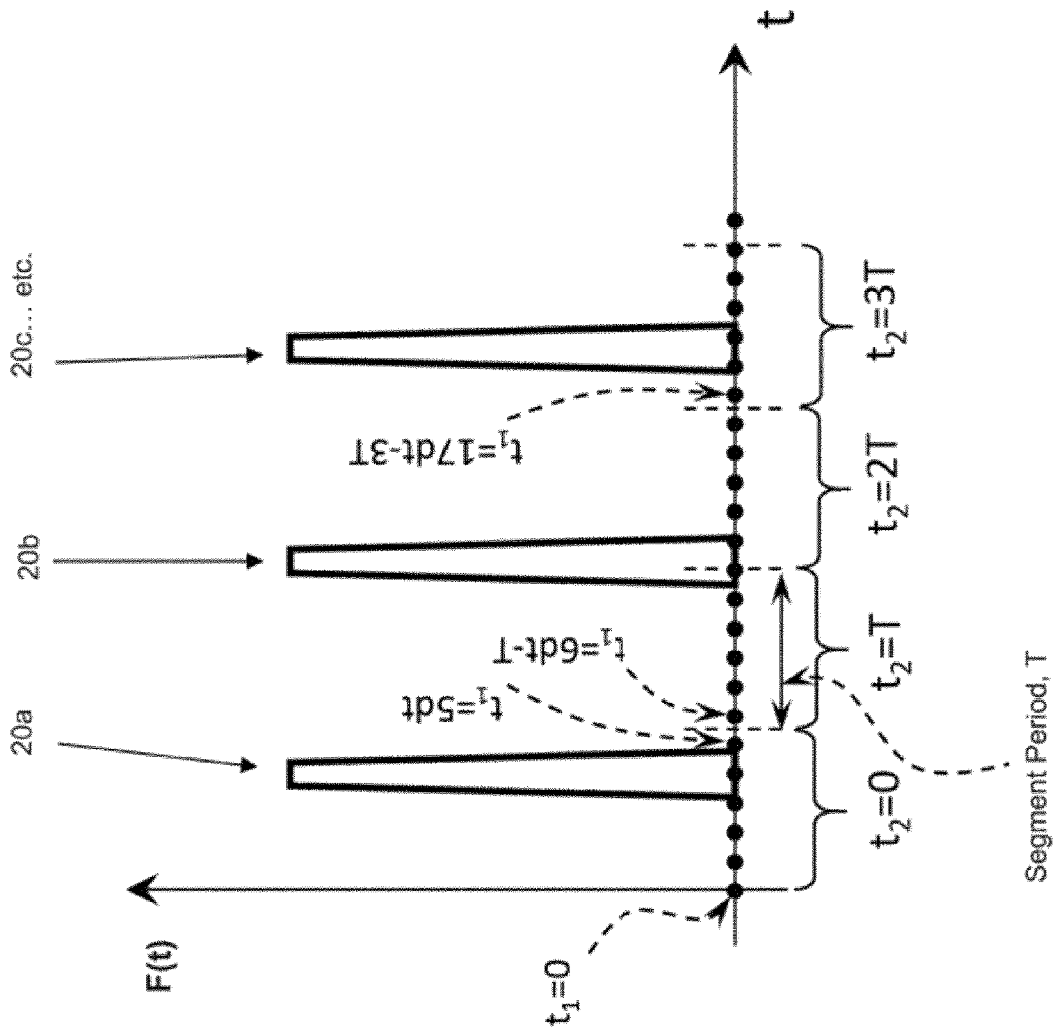
FIG. 5 shows a schematic representation of an image-charge/current signal such as shown in FIG. 4*a*, in which a process of segmentation is being applied.
Figure 6:
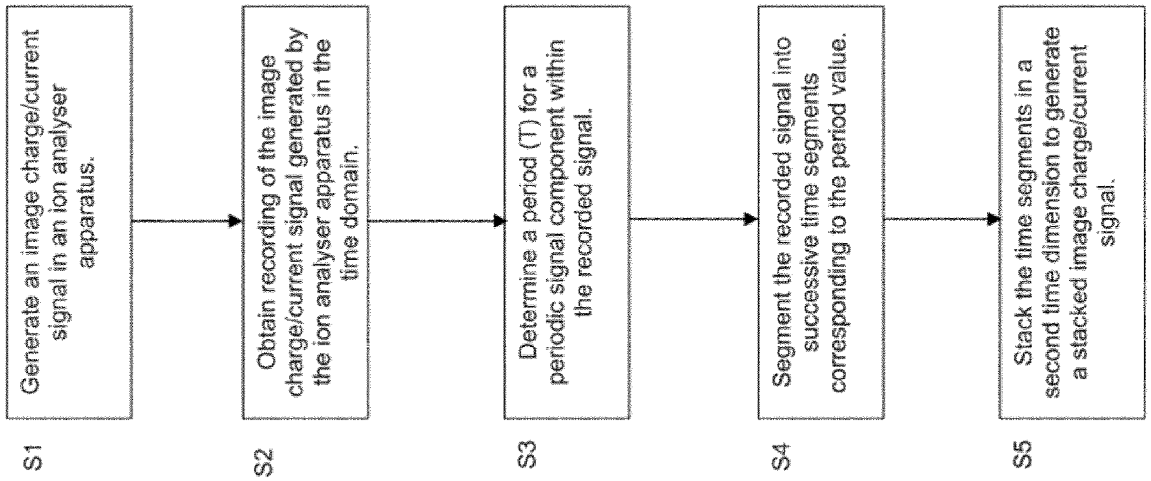
FIG. 6 shows a flow chart of steps in a process of generating a 2D function such as shown in FIG. 4*b*.

FIGS. 5 and 6 schematically represent the procedure for determining a value, T, for the period of the periodic signal component within the image-charge/current signal, $F_1(t)$, in the method for generating the 2D function $F(t_1,t_2)$. FIG. 6 represents the steps S1 to S5 of the method, which are implemented at steps S2 to S5. The first step in the method is to generate an image charge/current signal (step S1), and then to record the image charge/current signal in the time domain (step S2).

The acquired recording of the one-dimensional time domain image-charge/current signal, $F_1(t)$ of FIG. 5, contains one or more periodic oscillations. These periodic components may correspond to frequency components $f_1=1/T_1$, $f_2=1/T_2$ . . . etc.

Subsequently, step S3 of the method determines a period (T) for a periodic signal component within the recorded signal, and this step may comprise the following sub-steps:

(1) A first sub-step is to sample the one-dimensional time domain signal $F_1(t)$ of FIG. 5, with a sampling step of size "δt".

(2) A second sub-step is to estimate a value for the time period, $T_i$ (i=1, 2, . . . ), of each of the periodic/frequency components $f_1=1/T_1$, $f_2=1/T_2$ . . . etc. This may be done by means of any suitable spectral decomposition method as would be readily apparent the skilled person, or may be done purely by initially guessing those values and applying the present methods iteratively until a consistent result is found.

(3) A third sub-step is to segment the one-dimensional signal, $F_1(t)$, and co-register the time segments according to a chosen period (frequency) value, $f_i=1/T_i$, so as to form the 2D function $F(t_1,t_2)$. In particular, the argument $t_1$ starts at $t_1$=0 (zero) and every subsequent sampling step increases along the $t_1$ axis by a step-size "δt": initially the argument $t_2$=0 (zero) during this process. After time $t_1$ is equal to or greater than T has been reached, the argument $t_1$ is reset to $t_1$=0 (zero) and the argument $t_2$ increases by a step size of T, i.e. $t_2$=T. Thus, each sampling point of the measured signal is attributed to a pair of values, ($t_1$, $t_2$). In this way a 2D mesh/plane ($t_1$, $t_2$) is formed. This constitutes a "separating" of the co-registered time segments along a second time dimension, $t_2$, transverse to the first time dimension thereby to generate a stack of time segments collectively defining a 2-dimensional (2D) function. The resulting function $F_2(t_1,t_2)$ can be thought of as a set of layers $F(t_1)$ where $t_1$ is always within interval [0;T] and each layer corresponds to a certain $t_2$ having a constant value (an integer multiple of T) within the layer.

Figure 7:
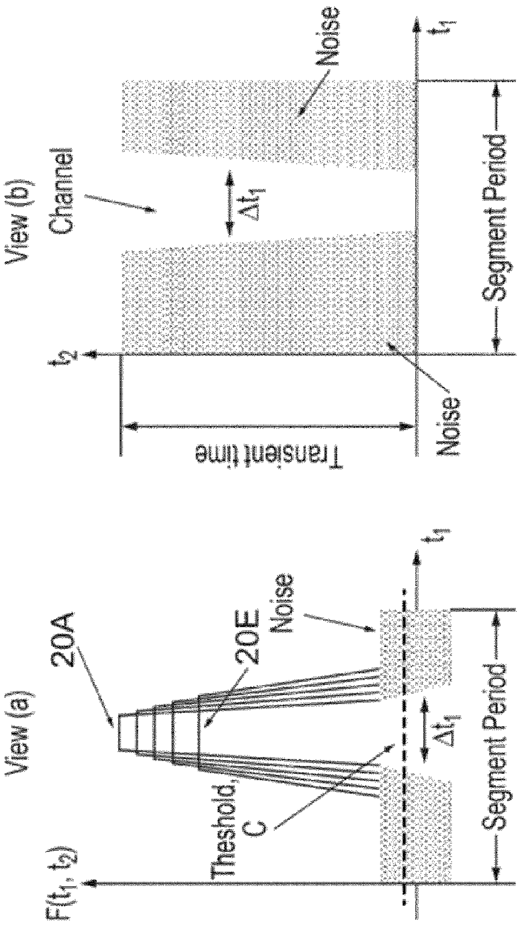
FIG. 7 includes a "view (a)" and a "view (b)".
Figure 8:
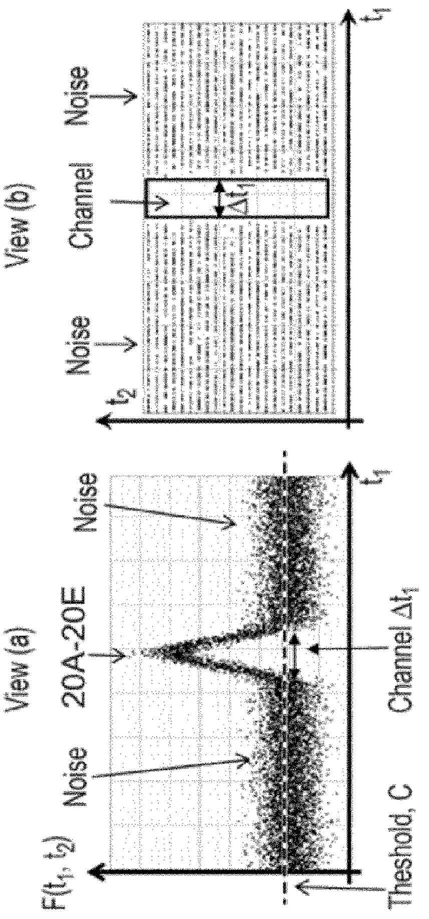
FIG. 8 includes a "view (a)" and a "view (b)".

(4) A fourth sub-step, according to a first option, is to generate a first 2D scatter graph may be generated such that $F(t_1, t_2=\text{fixed})$, ignoring variation in $t_2$ values, corresponds to viewing $F_2(t_1,t_2)$ along "View (a)" and will result in all layers been seen to overlap onto each other. For a proper choice of segment period, T, a peak can be seen above noise area, as shown in FIG. 7 "view (a)" and FIG. 8 "view (a)".

(5) A fourth sub-step, according to a second option, is to generate a second 2D scatter graph may be generated such showing $F_2(t_1,t_2)$ subject to the following condition: plot point (t2;t1) if $|F_2(t_1,t_2)|<C$ where C is a predetermined threshold value (e.g. a pre-defined signal level), otherwise skip/omit it from the plot. For a proper choice of segment period, T, a clear channel, substantially free of data points, will appear to extend along a path parallel to the $t_2$ axis, surrounded/bounded by points as shown in FIG. 7 "view (b)" and FIG. 8 "view (b)". It is to be understood that the condition $|F_2(t_1,t_2)|>C$ is also possible, and this condition this will make a 'filled' channel (i.e., a ridge or band of data points) with clear space (or a space sparsely populated with data points) around it in the 2D space as shown in FIG. 3*a* (ridge 29) and FIG. 3*b* (ridge 30).

The value for the period, T, may be arrived at iteratively, using procedures (4) or/and (5) to decide whether the chosen period value corresponding to a frequency component of signal $F_1(t)$. This decision may be based on certain criteria. For example, according to method (4), if the representation of $F_2(t_1,t_2)$ contains a peak-shaped dense area then this is categorized as a frequency component. Examples are shown in FIG. 7 "view (a)" and FIG. 8 "view (a)". Alternatively, or in addition, according to method (5), for a pre-defined signal threshold level, C, if the representation of $F_2(t_1,t_2)$ contains a clear and substantially straight channel extending along a path parallel to $t_2$ axis, then this is categorized as a frequency component. Examples are shown in FIG. 7 "view (b)" and FIG. 8 "view (b)". Both methods provide a means of identifying when the chosen segment period, T, (i.e. the length of each time segment) accurately matches the actual time period of the periodic component within the signal, $F_1(t)$. Only then will each signal peak of the periodic component in successive time segments 'line-up' in a linear fashion along a path parallel to the axis of the stacking dimension ($t_2$). If the chosen segment period, T, does not accurately match the actual time period of the periodic component within the signal, $F_1(t)$, then the signal peak of the periodic component in successive time segments will not 'line-up' in a linear fashion along a path parallel to the axis of the stacking dimension. Instead, the peaks will drift along a path diverging either towards the axis of the stacking dimension, or away from it.

FIG. 3*a* shows an example of how this method determines a time period, T, (and therefore a signal frequency) of a 'parent' ion (FIG. 3*a*) as revealed when successive time segments 'line-up' in a linear fashion along a path parallel to the axis of the stacking dimension to show an aligned sequence 29 of signal peaks persisting for a few hundred milliseconds before disappearing at a time of about 450 ms when the 'parent' ion responsible for the signal peaks lost mass, due to neutral loss process 24, and increased in oscillation frequency due to the loss of a neutral loss particle mass. The increased frequency is determined by determining a new time period, T, (and therefore a new signal frequency) of a 'daughter' ion (FIG. 3*b*) as revealed when successive time segments 'line-up' in a linear fashion along a path parallel to the axis of the stacking dimension to show an aligned sequence 30 of signal peaks persisting for about 1200 ms before disappearing at a time of about 1600 ms when the 'daughter' ion responsible for the signal peaks is lost.

Figure 9:
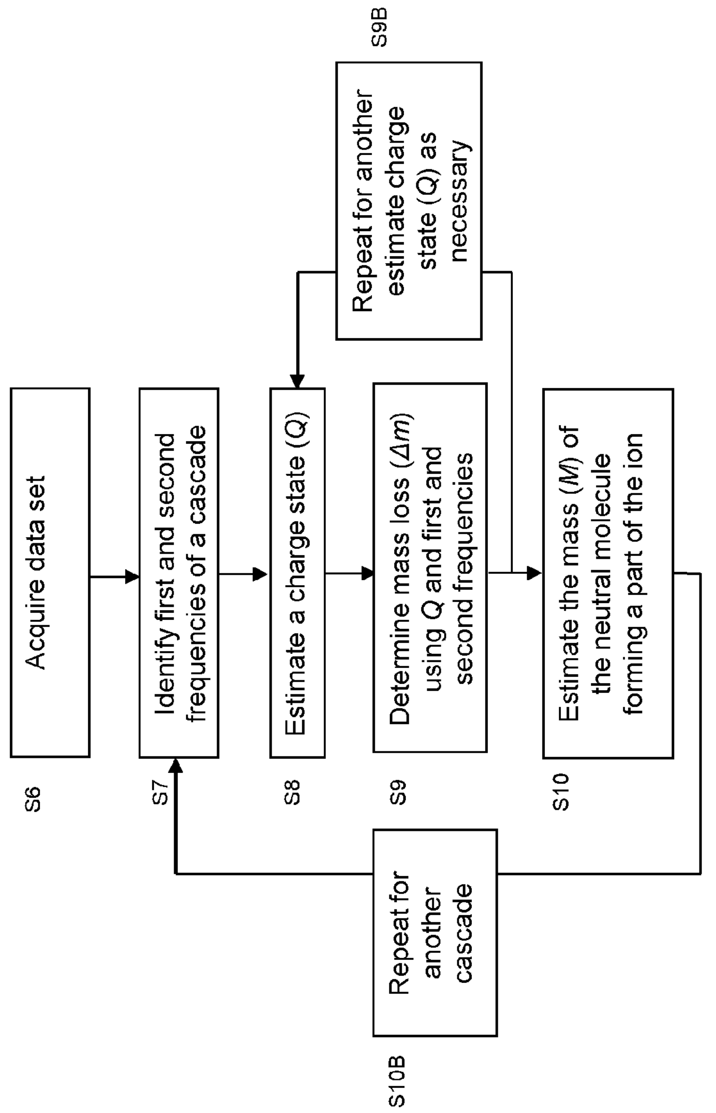
FIG. 9 shows a flow chart of steps in a process of generating an estimate of the mass (M) of the neutral molecule forming a part of an ion mass by exploiting a process of neutral loss.

FIG. 9 schematically shows steps in a process, implemented by the signal processor 12, of estimating the mass of an ion. The method comprises the following steps:

Step S6: Acquire a data set comprising image-charge/current signals.

Step S7: Identify a first measured signal frequency ($\omega_1$) associated with a first measured image-charge/current signal of an ion and a second measured signal frequency ($\omega_2$) associated with a subsequent second measured image-charge/current signal of the ion.

Step S8: Estimate a charge state (Q) of the ion undergoing oscillatory motion of the first measured signal frequency ($\omega_1$) and subsequently of the second measured signal frequency ($\omega_2$).

Step S9: Estimate the value of a mass change of the ion using the estimated charge:

$$\Delta m = Q\left[\left(\frac{\alpha}{\omega_1}\right)^2 - \left(\frac{\alpha}{\omega_2}\right)^2\right]$$

substantially matches a reference mass corresponding to a mass of one or more neutral loss particle species where $\alpha$ is a pre-set calibration constant.

Step 9B: Repeat Step S8 and Step S9 for another estimate charge state (Q) as necessary to achieve the desired substantial match to a reference mass corresponding to a mass of one or more neutral loss particle species. Once achieved, GOTO Step S10.

Step S10: Estimate the mass (M) of the deprotonated molecule 31 forming a part of the ion according to the estimated charge state (Q) of the ion, the first measured signal frequency ($\omega_1$), the quantified mass change value $\Delta m$, and the mass-to-charge ratio ($m_p/e$) of a proton, according to the relation:

$$M = Q\left[\left(\frac{\alpha}{\omega_1}\right)^2 - \left(\frac{m_p}{e}\right)\right] - \Delta m.$$

Step S10B: Optionally: Repeat Steps S7 to Step S10 for a plurality of other cascades of 'parent'-to-'daughter' image charge/current signal pairings for the ion. Calculate an average value of the plurality of estimates of the mass ($M_{AVE}$) of the deprotonated molecule 31 forming a part of the ion and use this average as the mass estimate.

Figure 10B:
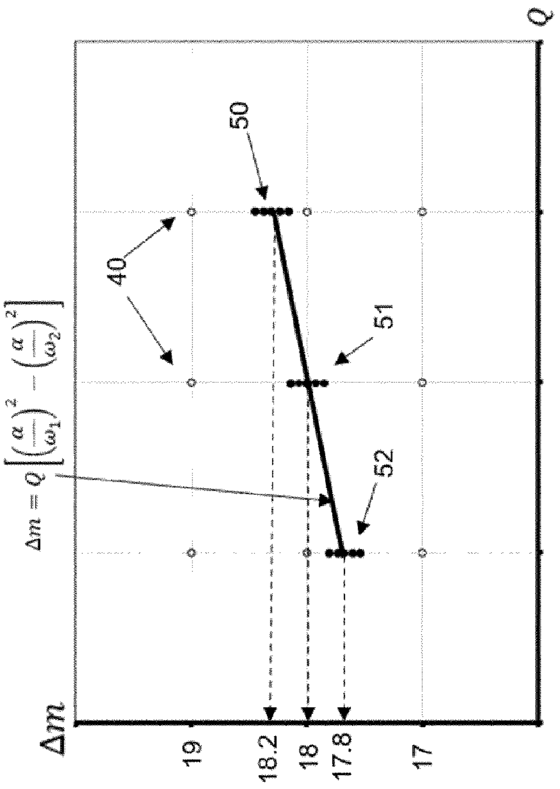
FIGS. 10*a* and 10*b* show schematic examples of the linear relationship between a mass loss value caused by neutral loss from an ion and the charge state of the ion, as quantified by changes in image-charge/current signal frequencies occurring due to neutral loss.
Figure 10A:
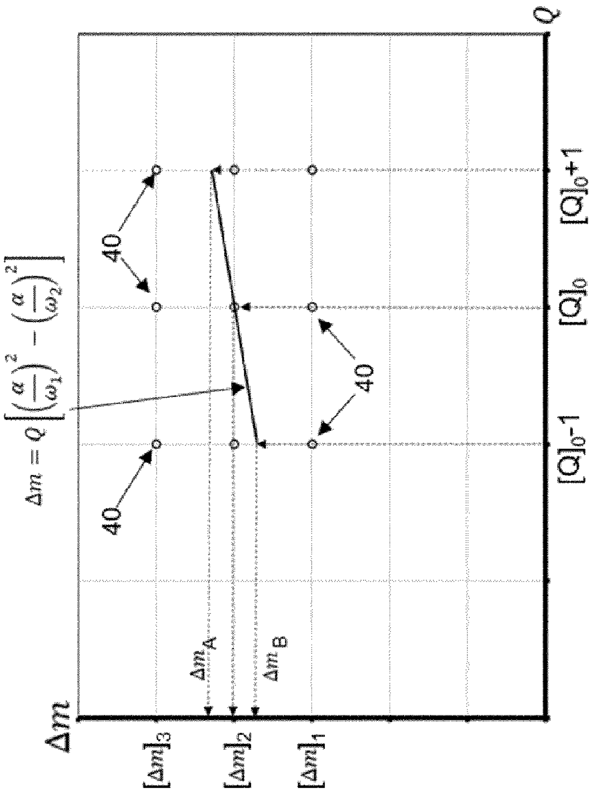

FIGS. 10*a* and 10*b* show schematic examples of the linear relationship between a mass loss value caused by neutral loss from an ion and the charge state of the ion, as quantified by changes in image-charge/current signal frequencies occurring due to neutral loss.

In particular, FIG. 10*a* shows a schematic example of the neutral mass-loss equation:

$$\Delta m = Q\left[\left(\frac{\alpha}{\omega_1}\right)^2 - \left(\frac{\alpha}{\omega_2}\right)^2\right]$$

This equation defines a straight-line graph in which Q is the independent variable (x-axis) and Δm is the dependent variable (y-axis). The gradient of this line is defined by the quantity:

$$\left[\left(\frac{\alpha}{\omega_1}\right)^2 - \left(\frac{\alpha}{\omega_2}\right)^2\right]$$

If Q and Δm are both allowed to be real-valued numbers able to take any value on the number line, then the neutral mass loss equation permits Q and Δm to be relatively unconstrained, making it difficult to estimate a value of Q results in a realistic estimated value of Δm. However, the inventors have realised that one can apply three constraints on Q and Δm as follows:

(1) Q must be an integer [Q] (e.g., positive). This is because nature requires ion charges to be quantised in units of the electron charge.

(2) Δm must be very close to an integer [Δm] (positive). This is because nature quantises the mass of neutral losses to be substantially/approximately equal to integer multiples of the proton mass (here we ignore electron mass and we ignore any difference between neutron masses and proton masses).

(3) The integer values of [Q] and [Δm] can be constrained to be within certain sensible finite ranges determined by the conditions know to prevail in practice. For example, they cannot take values that are obviously too small or obviously too large etc. based on the knowledge of the skilled person in the circumstances.

When these constraints are applied we find that the mass loss equation will only be true when the straight-line graph:

$$\Delta m = Q\left[\left(\frac{\alpha}{\omega_1}\right)^2 - \left(\frac{\alpha}{\omega_2}\right)^2\right]$$

passes through a coordinate ([Q], [Δm]) in which both [Q] and [Δm] are integers (or approximately integers in the case of [Δm]). There exists a field of integer coordinate points 40 which are show as large open dots in FIG. 10*a* and FIG. 10*b*. These open dots define a field of a finite number of points in a vertical band extending parallel to the Δm axis and having a thickness extending from $[Q]_0-1$ to $[Q]_0+1$ (i.e., the constraints imposed on the range of estimates for [Q]). One can see that for a given fixed gradient of the straight-line graph 50 the straight-line will pass through just one integer coordinate position ($[Q]_0$, $[\Delta m]_2$) within the field of integer coordinates in the graph. The position of the integer coordinate point intercepted by the straight line within the integer coordinate field depends on the gradient of the line, namely, the value of:

$$\left[\left(\frac{\alpha}{\omega_1}\right)^2 - \left(\frac{\alpha}{\omega_2}\right)^2\right]$$

It is these integer-valued coordinates that provide estimates of ($[Q]_0$, $[\Delta m]_2$) and permit one to disregard other estimated values of ion charge state, such as ($[Q]_0-1$) or ($[Q]_0+1$) which predict non-integer mass loss values of $\Delta m_B$ and $\Delta m_A$ respectively, and one to disregard other estimated integer-valued neutral mass loss values, such as $[\Delta m]_1$ or $[\Delta m]_3$.

For example, FIG. 10*b* shows a close-in view of the straight-line graph of FIG. 10*a* in which integer values have been assigned to three successive neutral mass loss values along the y-axis of the graph, namely: $[\Delta m]_1=17$ Da, $[\Delta m]_2=18$ Da and $[\Delta m]_3=19$ Da. The straight-line graph passes sufficiently closely through the one integer coordinate position ($[Q]_0$, $[\Delta m]_2=18$ Da) within the field of integer coordinates in the graph. This provides an estimate of ion charge state and neutral mass loss due to the proximity of the straight-line graph to this integer coordinate position.

However, the same straight line is not sufficiently proximate to any integer coordinate position when estimated values of ion charge state are $[Q]_0-1$ or $[Q]_0+1$. When these charge states are input to the straight-line graph, the resulting neutral mass loss estimates are, respectively, [Δm]=17.8 Da and [Δm]=18.2 Da. Neither of these neutral mass loss estimates is sufficiently close to a nominal integer value to be considered a viable estimate. Also shown in FIG. 10*b* are clusters (50, 51, 52) of data points each corresponding to multiple respective 'parent'-to-'daughter' dissociation events (see FIGS. 2*a* and 2*b*) in which a neutral mass loss of the same mass value took place (i.e., the same neutral particle species dissociated from the ion in each event). An average value of the mass loss value, determined according to the above neutral mass loss equation (reproduced in FIGS. 10*a* and 10*b*), is determined in each cluster and is used to provide a mass loss estimate value for each cluster (i.e., [Δm]=17.8 Da when $[Q]_0-1$ is the charge estimate, [Δm]=18 Da when $[Q]_0$ is the charge estimate, and [Δm]=18.2 Da when $[Q]_0+1$ is the charge estimate).

The following criteria may be used for determining a particle mass associated with a neutral loss event. For a given mass loss event:

Check that the following condition is satisfied:

$$\left[\left(\frac{\alpha}{\omega_1}\right)^2 - \left(\frac{\alpha}{\omega_2}\right)^2\right] \leq X$$

Here the quantity X<<1.0 is a pre-set threshold value which may be a value in the range 0<X≤0.5, or preferably in the range 0<X≤0.25. or desirably in the range 0<X≤0.1. If this condition is not satisfied do not consider this event further (e.g., seek another neutral loss event to consider).

If the above condition is satisfied, then generate estimate mass losses (Δm) for all trial values of the ion charge state (e.g., [Q]−2, [Q]−1, [Q], [Q]+1, [Q]+2) to provide a plurality of different integer-valued estimated charge states ($[Q_i]$) and choose the mass loss estimate (Δm) that lies closest to a nominal integer-valued reference mass having an integer value in Daltons (e.g. 18 Da). Determine whether the closest-lying mass loss estimate lies within a pre-set threshold proximity range from the nominal integer-valued reference mass, e.g., a proximity of not more than 0.2 Da, or more preferably not more than 0.1 Da. Here, the term 'proximity' may be taken to mean the value of the difference between the closest-lying mass loss estimate value and the nominal integer-valued reference mass value. This gives the estimated ion charge $[Q]_{EST}$ and estimated mass loss value $\Delta m_{EST}$.

If all of trial charges $[Q_i]$ give a respective mass loss that is too far from a nominal integer-valued reference mass loss value (e.g., they give values of: 17.8 Da, 18.2 Da, 18.4 Da, 18.5 Da, etc.) then do not consider this event further (e.g., seek another neutral loss event to consider).

Figure 11:
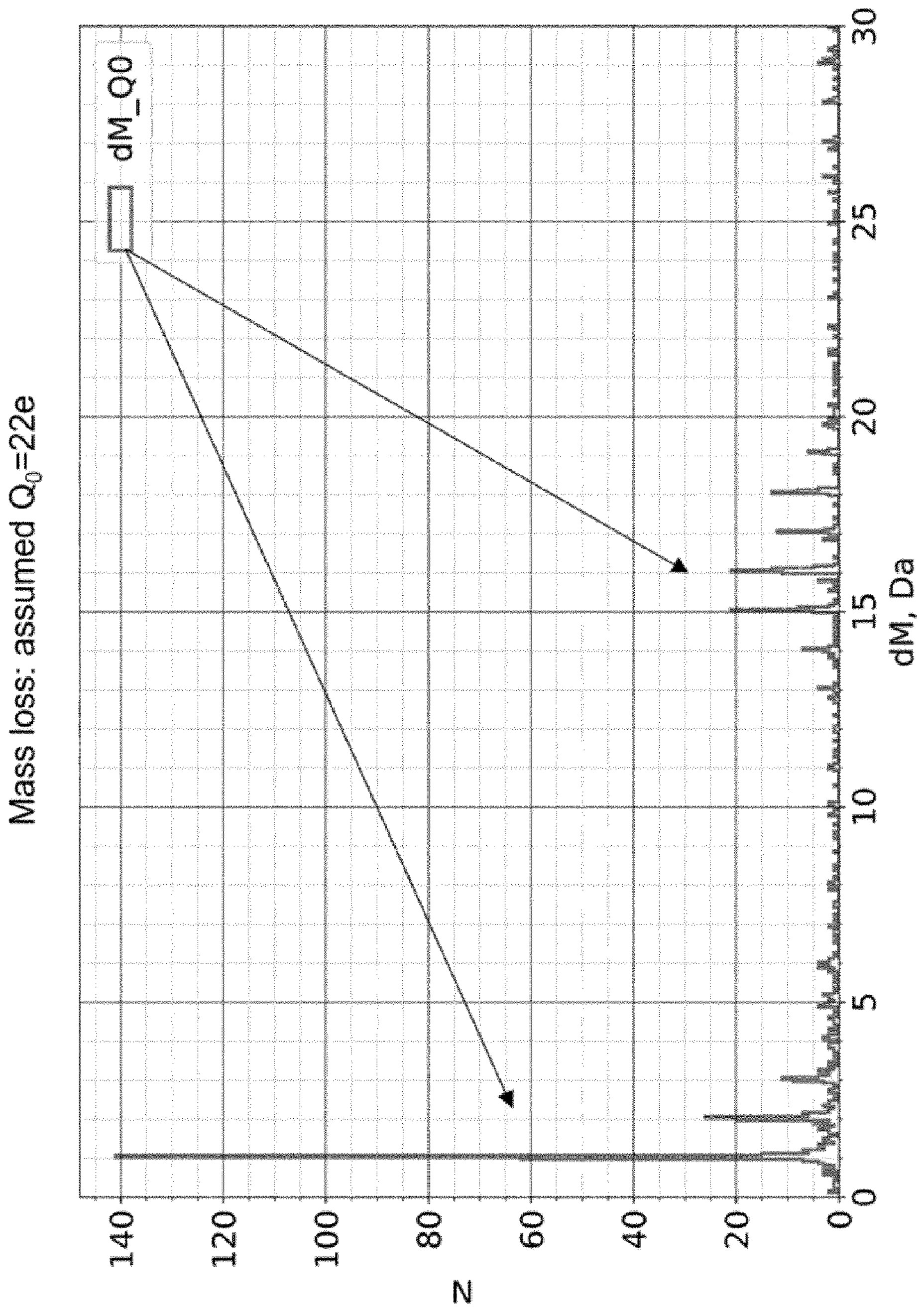
FIG. 11 shows a histogram of mass losses calculated for all events found in dataset.
Figure 12:
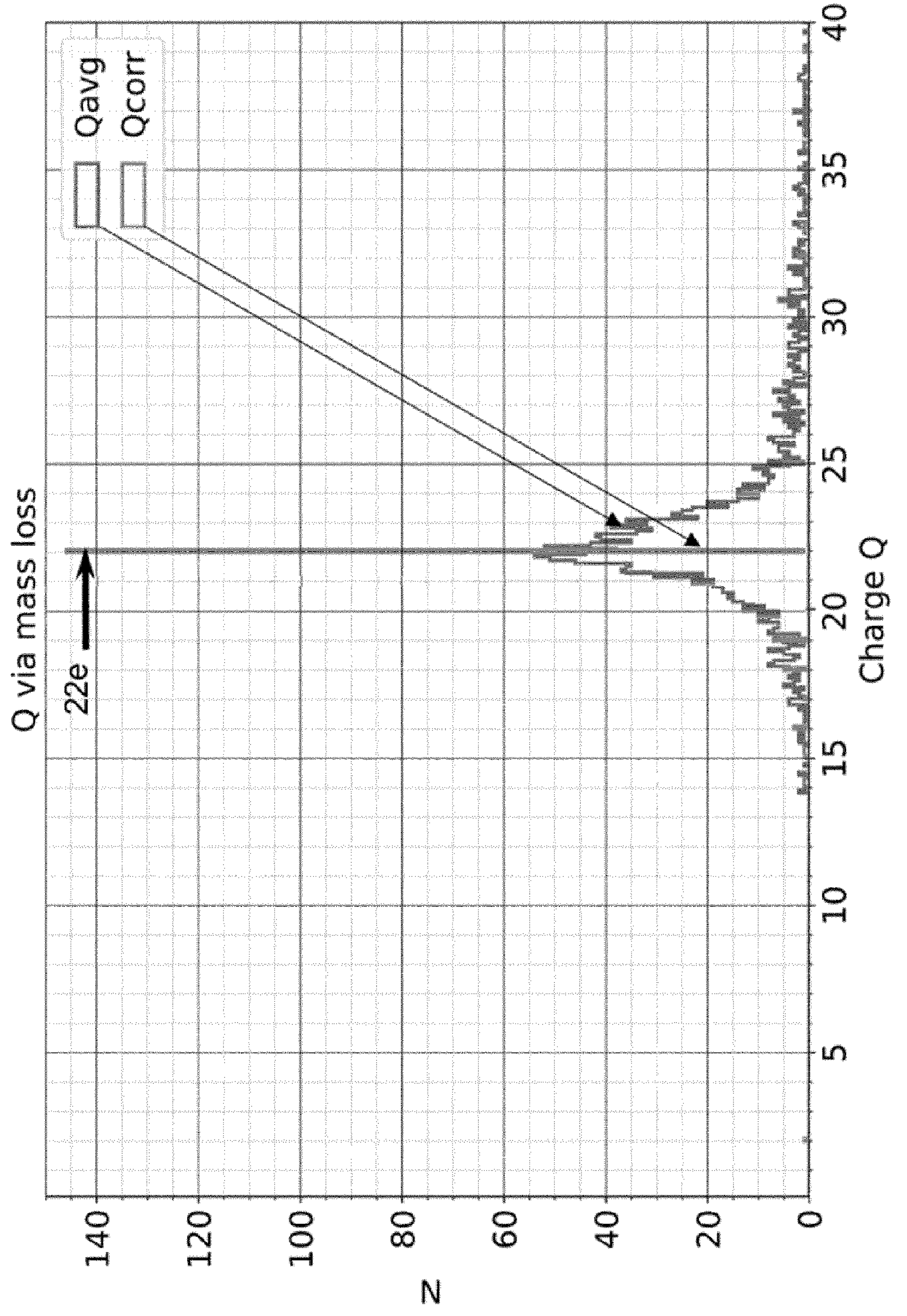
FIG. 12 shows charge histograms obtained using detected charge ("Qavg") and charge deduced via neutral mass loss according to the invention ("Qcorr"). Charge accuracy by mass loss analyses is better than by simple charge detection.

FIGS. 11 and 12 show experimental data obtained in a Charge-Detection Mass Spectrometer (CDMS) experiment with Myoglobin ions produced by electrospray ionisation (ESI). A quadrupole filter was configured to pass only 22H+ charged Myoglobin ions (i.e., protonated with twenty-two protons; and with m/z=771.25 Th) inside a cooling region. In particular, FIG. 10 shows a histogram of mass loss values calculated for all 'parent'-to-'daughter' cascade events found in the dataset from which the graphs of FIG. 3*a* and FIG. 3*b* were derived.

FIG. 12 shows a charge histogram obtained using a detected charge value ("Qavg") determined using prior art methods, and a charge deduced via neutral mass loss according to the invention ("Qcorr"). Charge accuracy by mass loss analyses is better than by simple charge detection.

Neutral fragmentations can be either "natural", i.e., when one doesn't need special pre-treatment of a sample or special adducts added into the sample solution; or they can be "artificial", i.e., when a sample is modified by [chemically] attaching an adduct (preferably weakly bonded so that it can be easily fragmented via collision or via other means) or by adding some agents into the sample solution to assist weak bonding attachment inside solution and/or during ion formation process in ESI source.

Neutral losses inside an ion trap of a mass analysis apparatus can occur naturally (in an uncontrollable manner) via collisions with gas. This process has a probabilistic nature and depends on background gas density (vacuum level), velocity (i.e., ion energy) and the collisional cross-section of an ion and gas molecule system. Other means are possible to initiate the fragmentation. Neutral mass losses inside the trap can be initiated in a controllable manner by means of:

Short background gas pressure is increased at the desired time (between start and end of acquisition time, preferably in the middle of it) by means of pulse gas valve Surface induced fragmentation, preferably at the reflection point when an ion's velocity is minimal. This process would be similar to well-known surface induced fragmentation. In normal oscillation conditions ions don't reach such surface so fragmentation does not occur. At the desired time (between start and end of acquisition time, preferably in the beginning of signal duration) the electrical field is changed for a short period of time to let ions approach the surface so that neutral fragmentation can occur. For example, a reflection electrode potential can be lowered. Preferably, a potential change should not be too high to avoid surface induced fragmentation of a protein backbone (e.g., it is either a too low potential or a too high drop (change) in potential of the gate electrode). In such a space-localized fragmentation point it is possible to reduce errors cause by an ion's energy change after fragmentation.

Laser irradiation at the desired time (between start and end of acquisition time, preferably in the beginning of signal duration) and at the desired space (preferably, at the point where kinetic energy is minimal, for example reflection region of the trap). Localization of a fragmentation event within the mentioned space can improve errors related to change in kinetic energies after such fragmentation (a change in ion's energy may affect its oscillation frequency). Preferably, the laser should deposit a moderate amount of energy on a protein ion to assist light neutrals detachment, but to refrain from protein backbone fragmentation. Preferably, the laser should be an infrared laser.

Controllable initiation of the neutral fragmentations may increase its probability and therefore will improve efficiency of such mass determination as one will see larger amount of neutral fragmentation events contributing to the statistical distribution of mass estimates thereby enhancing the best estimate of the mass ($M_{MODE}$) of the ion.

A process of mass-loss CDMS (mlCDMS) according to the invention can decrease detection times, because charge determination relies on frequency change detections, not on charge calculations with long time signal averaging (which is the case in prior art CDMS).

If applicable, it is preferrable to prepare ions for analysis. Such preparation can be done via a desolvation process. Desolvation may be carried out by means of collisions of a multiply charged ion of interest with a cooling gas (most popular are He, $N_2$ or Ar) in a cooling region before trap entrance, or simply collisions during transfer from ions source into a trap. Such desolvation can be intensified by accelerating ions (increase their energy in axial direction where the axis is directed along their transfer path) and vice versa. For example, it is preferrable to reduce desolvation efficiency if too few small mass neutral fragmentations are observed. Vice versa, if too many small mass neutral fragmentations are observed (so that it becomes difficult to apply the method) it is preferrable to do more intense desolvation, but not too intense so that still probability to see the neutral fragmentation is high. Too high desolvation energy is to be avoided to prevent ions fragmentation (e.g., protein backbone).

The invention may be applied in an ion analyser apparatus comprising any one or more of: an ion cyclotron resonance trap; an Orbitrap® configured to use a hyper-logarithmic electric field for ion trapping; an electrostatic linear ion trap (ELIT); a quadrupole ion trap; an ion mobility analyser; a charge detection mass spectrometer (CDMS); Electrostatic Ion Beam Trap (EIBT); a Planar Orbital Frequency Analyser (POFA); or a Planar Electrostatic Ion Trap (PEIT), for generating said oscillatory motion therein.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

WO2012/116765 (A1) (Ding et al.)

W. Shockley: "*Currents to Conductors Induced by a Moving Point Charge*", Journal of Applied Physics 9, 635 (1938).

S. Ramo: "*Currents Induced by Electron Motion*", Proceedings of the IRE, Volume 27, Issue 9, September 1939.

Murray, Kermit K., Boyd, Robert K., Eberlin, Marcos N., Langley, G. John, Li, Liang and Naito, Yasuhide. "*Definitions of terms relating to mass spectrometry* (*IUPAC Recommendations* 2013)" Pure and Applied Chemistry, vol. 85, no. 7, 2013, pp. 1515-1609. https://doi.org/10.1351/PAC-REC-06-04-06.

The invention claimed is:

1. A method of processing data determined from an image-charge/current signal representative of ions of a given charge state (Q) undergoing oscillatory motion of a respective oscillation frequency (ω) within an ion analyser apparatus, the method comprising:

acquiring a data set comprising a first measured signal frequency ($\omega_1$) associated with a first part of a measured image-charge/current signal of an ion and a second measured signal frequency ($\omega_2$) associated with a subsequent second part of the measured image-charge/current signal of the ion;

estimating a charge state (Q) of the ion undergoing oscillatory motion of said first measured signal frequency ($\omega_1$) and subsequently of said second measured signal frequency ($\omega_2$) such that the value of a mass change quantifiable as:

$$\Delta m = Q\left[\left(\frac{\alpha}{\omega_1}\right)^2 - \left(\frac{\alpha}{\omega_2}\right)^2\right]$$

substantially matches a reference mass corresponding to a mass of one or more neutral losses where α is a pre-set calibration constant; and, estimating the mass (M) of a deprotonated molecule forming a part of the ion according to the estimated charge state (Q) of the ion, the first measured signal frequency ($\omega_1$), the quantified mass change value Δm, and the mass-to-charge ratio ($m_p/e$) of a protonating proton, according to the relation:

$$M = Q\left[\left(\frac{\alpha}{\omega_1}\right)^2 - \left(\frac{m_p}{e}\right)\right] - \Delta m.$$

2. A method according to claim 1 wherein said estimating a charge state (Q) of the ion comprises initially estimating a non-integer value of the charge state and subsequently rounding the non-integer value to the nearest integer value such that the estimated charge state (Q) is positive integer.

3. A method according to claim 1 wherein said estimating a charge state (Q) of the ion comprises estimating an integer value of the charge state;

subsequently varying the integer value of the estimated charge state (Q) in integer-valued steps to provide a plurality of different integer-valued estimated charge states ($Q_i$);

comparing the reference mass of a neutral loss species to each mass change quantity (Δm) determined according to each said estimated charge states of the plurality of different integer-valued estimated charge states ($Q_i$); and, selecting the integer-valued estimated charge state which results in a value of the mass change quantity (Δm) that most closely matches a reference mass of a neutral loss species and determining the mass (M) of the deprotonated molecule forming a part of the ion according to the selected integer-valued estimated charge state.

4. A method according to claim 1 wherein:

said data set comprises a plurality of measured signal frequencies ($\omega_i$; i=integer >2) each associated with a respective part of the measured image-charge/current signal of an ion; and, said estimating the mass (M) of a deprotonated molecule forming a part of the ion comprises determining a plurality of estimates ($M_j$) of said mass of a deprotonated molecule based on a respective plurality of pairs of two measured signal frequencies selected from amongst said plurality of measured signal frequencies ($\omega_i$) comprising a respective said first measured signal frequency and a respective said second measured signal frequency; and, generating an average value of the plurality of estimates ($M_j$) of respective said deprotonated molecule as the estimated mass of a deprotonated molecule.

5. A method according to claim 1 including obtaining an image-charge/current signal and therefrom determining:

a start time $(LT_1)^{(1)}$ and an end time $(LT_2)^{(1)}$ of the image-charge/current signal corresponding to the first measured signal frequency ($\omega_1$); and, a start time $(LT_1)^{(2)}$ and an end time $(LT_2)^{(2)}$ of the subsequent second image-charge/current signal corresponding to the second measured signal frequency ($\omega_2$);

wherein the value of the start time $(LT_1)^{(2)}$ of the image-charge/current signal corresponding to the second measured signal frequency exceeds the value of the end time $(LT_2)^{(1)}$ of the image-charge/current signal corresponding to the first measured signal frequency on a mutual time scale by not less than a pre-set threshold value.

6. A method according to claim 1 wherein the second frequency exceeds the first frequency by a value not exceeding a pre-set threshold value.

7. A computer program or a computer program product comprising instructions which, when the program is executed by a computer, cause the computer to carry out the method of claim 1.

8. A data processing apparatus comprising one or more processors configured for carrying out the method of claim 1.

9. An ion analyser apparatus configured for generating an image-charge/current signal representative of ions of a given charge state (Q) undergoing oscillatory motion of a respective oscillation frequency (w) within an ion analyser apparatus, the apparatus comprising:

an ion analysis chamber configured for receiving said one or more ions and for generating said image charge/current signal in response to said oscillatory motion;

a signal recording unit configured for recording the image charge/current signal as a recorded signal in the time domain;

a signal processing unit for processing the recorded signal to:

acquire a data set comprising a first measured signal frequency ($\omega_1$) associated with a first part of a measured image-charge/current signal of an ion and a second measured signal frequency ($\omega_2$) associated with a subsequent second part of the measured image-charge/current signal of the ion;

estimate a charge state (Q) of the ion undergoing oscillatory motion of said first measured signal frequency ($\omega_1$) and subsequently of said second measured signal frequency ($\omega_2$) such that the value of a mass change quantifiable as:

$$\Delta m = Q\left[\left(\frac{\alpha}{\omega_1}\right)^2 - \left(\frac{\alpha}{\omega_2}\right)^2\right]$$

substantially matches a reference mass corresponding to a mass of one or more neutral losses where $\alpha$ is a pre-set calibration constant; and, estimate the mass (M) of a deprotonated molecule forming a part of the ion according to the estimated charge state (Q) of the ion, the first measured signal frequency ($\omega_1$), the quantified mass change value $\Delta m$, and the mass-to-charge ratio ($m_p/e$) of a protonating proton, according to the relation:

$$M = Q\left[\left(\frac{\alpha}{\omega_1}\right)^2 - \left(\frac{m_p}{e}\right)\right] - \Delta m.$$

10. An ion analyser apparatus according to claim 9 wherein the signal processing unit is configured to perform said estimating a charge state (Q) of the ion by initially estimating a non-integer value of the charge state and subsequently rounding the non-integer value to the nearest integer value such that the estimated charge state (Q) is positive integer.

11. An ion analyser apparatus according to claim 9 wherein the signal processing unit is configured to perform said estimating a charge state (Q) of the ion by:

estimating an integer value of the charge state;

subsequently varying the integer value of the estimated charge state (Q) in integer-valued steps to provide a plurality of different integer-valued estimated charge states ($Q_i$);

comparing the reference mass of a neutral loss species to each mass change quantity ($\Delta$m) determined according to each said estimated charge states of the plurality of different integer-valued estimated charge states ($Q_i$); and, selecting the integer-valued estimated charge state which results in a value of the mass change quantity ($\Delta$m) that most closely matches a reference mass of a neutral loss species and determining the mass (M) of the deprotonated molecule forming a part of the ion according to the selected integer-valued estimated charge state.

12. An ion analyser apparatus according to claim 9 wherein said data set comprises a plurality of measured signal frequencies ($\omega_i$; i=integer >2) each associated with a respective part of the measured image-charge/current signal of an ion, and wherein the signal processing unit is configured to estimate the mass (M) of a deprotonated molecule forming a part of the ion by:

determining a plurality of estimates ($M_j$) of said mass of a deprotonated molecule based on a respective plurality of pairs of two measured signal frequencies selected from amongst said plurality of measured signal frequencies ($\omega_i$) comprising a respective said first measured signal frequency and a respective said second measured signal frequency; and, generating an average value of the plurality of estimates ($M_j$) of respective said deprotonated molecule as the estimated mass of a deprotonated molecule.

13. An ion analyser apparatus according to any of claims 9 to 12 wherein the signal processing unit is configured to determine from the recorded signal:

a start time $(LT_1)^{(1)}$ and an end time $(LT_2)^{(1)}$ of the image-charge/current signal corresponding to the first measured signal frequency ($\omega_1$); and, a start time $(LT_1)^{(2)}$ and an end time $(LT_2)^{(2)}$ of the subsequent second image-charge/current signal corresponding to the second measured signal frequency ($\omega_2$);

wherein the value of the start time $(LT_1)^{(2)}$ of the image-charge/current signal corresponding to the second measured signal frequency exceeds the value of the end time $(LT_2)^{(1)}$ of the image-charge/current signal corresponding to the first measured signal frequency on a mutual time scale by not less than a pre-set threshold value.

14. An ion analyser apparatus according to claim 9 wherein the second frequency exceeds the first frequency by a value not exceeding a pre-set threshold value.

15. An ion analyser apparatus according to claim 9 comprising any one or more of: an ion cyclotron resonance trap; an Orbitrap® configured to use a hyper-logarithmic electric field for ion trapping; an electrostatic linear ion trap (ELIT); a quadrupole ion trap; an ion mobility analyser; a charge detection mass spectrometer (CDMS); Electrostatic Ion Beam Trap (EIBT); a Planar Orbital Frequency Analyser (POFA); or a Planar Electrostatic Ion Trap (PEIT), for generating said oscillatory motion therein.

* * * * *